(12) United States Patent
Dotzler et al.

(10) Patent No.: US 9,088,316 B2
(45) Date of Patent: Jul. 21, 2015

(54) TRANSMISSION FILTER CALCULATOR, COMMUNICATION DEVICE AND METHODS

(71) Applicant: NTT DOCOMO, Inc., Chiyoda-ku, Tokyo (JP)

(72) Inventors: Andreas Dotzler, Munich (DE); Wolfgang Utschick, Munich (DE); Guido Dietl, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 13/853,427

(22) Filed: Mar. 29, 2013

(65) Prior Publication Data

US 2013/0259157 A1    Oct. 3, 2013

(30) Foreign Application Priority Data

Mar. 30, 2012 (EP) .................................. 12162634

(51) Int. Cl.
*H04K 1/02* (2006.01)
*H04B 7/04* (2006.01)
*H04L 25/03* (2006.01)

(52) U.S. Cl.
CPC ............ *H04B 7/0456* (2013.01); *H04B 7/0426* (2013.01); *H04B 7/0452* (2013.01); *H04L 25/03343* (2013.01); *H04L 25/03898* (2013.01); *H04B 7/0465* (2013.01)

(58) Field of Classification Search
CPC .. H04B 7/0456; H04B 7/0426; H04B 7/0452; H04B 7/0465; H04B 3/542; H04L 25/03898; H04L 25/03343
USPC ......................................................... 375/296
See application file for complete search history.

(56) References Cited

U.S. PATENT DOCUMENTS 6,888,809 B1 *   5/2005  Foschini et al. ................ 370/334

FOREIGN PATENT DOCUMENTS

EP          1 117 197 A2       7/2001
EP          2124351 A1        11/2009
(Continued)

OTHER PUBLICATIONS

Brehmer, Johannes et al., "Optimal Interference Management in Multi-Antenna, Multi-Cell Systems," Proceedings of the International Zurich Seminar on Communications, Mar. 2010, pp. 134-137.

(Continued)

*Primary Examiner* — Juan A Torres
(74) *Attorney, Agent, or Firm* — Brinks Gilson & Lione

(57) ABSTRACT

A transmission filter calculator for calculating at least a transmit filter for communication from a multi-antenna transmit communication device to a multi-antenna receive communication device via a multiple-input-multiple-output (MIMO) channel iteratively determines transmit filters for multiple data streams. The transmission filter calculator chooses a transmit filter in a given iteration such that the transmit filter is orthogonal to one or more transmit filters chosen in one or more previous iterations, and such that a weighted or unweighted transmission rate obtainable using the transmit filter chosen in the given iteration is maximized, and chooses the transmit filter in dependence on a matrix product term which is based on a channel matrix describing MIMO channel characteristics between the transmit communication device and a currently considered one of the receive communication devices and on a distortion covariance matrix describing a noise, an inter-cell interference and an upper limit of an intra-cell interference.

5 Claims, 17 Drawing Sheets

(56) References Cited

FOREIGN PATENT DOCUMENTS

EP          2124351 B1    12/2010
JP        2001-237751 A    8/2001

OTHER PUBLICATIONS de Francisco, Ruben et al., "Orthogonal Linear Beamforming in MIMO Broadcast Channels," In IEEE Wireless Communications and Networking Conference 2007, Mar. 2007, pp. 1210-1215.
de Francisco, Ruben et al., "An Optimized Unitary Beamforming Technique for MIMO Broadcast Channels," IEEE Transactions on Wireless Communications, vol. 9(3), Mar. 2010, pp. 990-1000.
Dotzler, Andreas et al., "Multi-cell MIMO Communications," Technical Report, Technische Universität Munchen, Nov. 2010. Final Technical Report of the Research Cooperation: Multicell MIMO Communications—Phase I, NTT DoCoMo Euro Labs and TUM, 101 pages.
Dotzler, Andreas et al., "Multi-cell MIMO Communications," Technical Report, Technische Universität Munchen, Nov. 2011. Technical Report of the Research Cooperation: Multicell MIMO Communications—Phase II, NTT DoCoMo Euro Labs and TUM, 40 pages.
Dotzler, Andreas et al., "Uplink-Downlink Minimax Duality With Linear Conic Constraints," Technical Report, 2012, Draft Submitted to ISIT, May 3, 2013, 11 pages.
Duplicy, Jonathan et al., "Adaptive Orthogonal Beamforming for the MIMO Broadcast Channel," In 2nd IEEE International Workshop on Computational Advances in Multi-Sensor Adaptive Processing, CAMPSAP 2007, IEEE, Dec. 2007, pp. 77-80.
Guthy, Christian et al., "Efficient Linear Successive Allocation for the MIMO Broadcast Channel," IEEE, 42$^{nd}$ Asilomar Conference on Signals, Systems and Computers, 2008, pp. 336-340.
Guthy, Christian et al., "Low-Complexity Linear Zero-Forcing for the MIMO Broadcast Channel," IEEE Journal of Selected Topics in Signal Processing, vol. 3, No. 6, Dec. 2009, pp. 1106-1117.
Hunger, Raphael et al., "A Combinatorial Approach to Maximizing the Sum Rate in the MIMO BC with Linear Precoding," In 42nd Asilomar Conference on Signals, Systems and Computers, IEEE, Oct. 2008, pp. 316-320.
Ivrlac, Michel T. et al., "Intercell-Interference in the Gaussian MISO Broadcast Channel," In IEEE Global Telecommunications Conference, 2007. GLOBECOM '07, Nov. 2007, pp. 3195-3199.
Jalali, Ali et al., "Closed-Form Expression for Optimal Two-User MIMO Unitary Precoding," IEEE Communications Letters, vol. 13(4), Apr. 2009, pp. 251-253.
Jindal, Nihar et al., "On the Duality of Gaussian Multiple-Access and Broadcast Channels," IEEE Transactions on Information Theory, vol. 50(5), May 2004, 768-783.
Kim, James (Sungjin) et al., "On the Performance of Multiuser MIMO Systems in WCDMA/HSDPA: Beamforming, Feedback and User Diversity," The Institute of Electronics, Information and Communications Engineers, IEEE Transactions on Communications, vol. E89-B (8), Aug. 2006, 2161-2169.
Liang, Fang et al., "A User Scheduling Scheme for MU-MIMO System with Coordinated Beamforming," In 2$^{nd}$ International Conference on Advanced Computer Control (ICACC), vol. 4, IEEE, Mar. 2010, pp. 462-465.
Osseiran, Afif et al., "Closed Loop Transmit Diversity in WCDMA HS-DSCH," In Proc. 61st Vehicular Technology Conference, IEEE, VTC 2005-Spring, vol. 1, 2005, 349-353.
Rossi, M. et al., "Non-Convex Utility Maximization in Gaussian MISO Broadcast and Interference Channels," In IEEE International Conference on Acoustics, Speech and Signal Processing, IEEE, May 2011, pp. 2960-2963.
Tejera, P. et al., "Patent: Subchannel Allocation in Multiple Input Multiple Output Multiuser Communication Systems," Jul. 2004, Technical Report, NTT DoCoMo Cooperation, Adaptive Antenna Concepts for 4G Wireless Communications, 18 pages.
Tejera, Pedro et al., "Subchannel Allocation in Multiuser Multiple Input Multiple Output Systems," IEEE Transactions on Information Theory, vol. 52(10), Oct. 2006, pp. 4721-4733.
Tenenbaum, Adam J. et al., "Linear Processing and Sum Throughput in the Multiuser MIMO Downlink," IEEE Transactions on Wireless Communications, vol. 8(5), May 2009, pp. 2652-2661.
Wagner, Sebastian et al., "On Unitary Beamforming for MIMO Broadcast Channels," In IEEE International Conference on Communications (ICC), May 2010, 5 pages.
Weingarten, Hanan et al., "The Capacity Region of the Gaussian Multiple-Input Multiple-Output Broadcast Channel," IEEE Transactions on Information Theory, vol. 52(9), Sep. 2006, pp. 3936-3964.
Dotzler, Andreas et al., "Linear Successive User Allocation in the Multi-Cell MIMO Environment," *Wireless Communications and Networking Conference (WCNC)*, IEEE WCNC 2011, Mar. 2011, pp. 1840-1845.
Dotzler, Andreas et al., "Efficient Zero-Forcing Based Interference Coordination For MISO Networks," *Vehicular Technology Conference (VTC Spring)*, IEEE 2011 73$^{rd}$, May 2011, pp. 1-5.
Office Action, and English language translation thereof, in corresponding Japanese Application No. 2013-069413, dated Mar. 4, 2014, 7 pages.

* cited by examiner $$\Pi^{(1)} = I$$
for $d = 1, \ldots, N_{tx}$ do

$$(s_d, u_d, v_d) = \underset{\substack{s_d \in \mathcal{K} \\ u_d^H u_d = 1 \\ v_d^H v_d = 1}}{\operatorname{argmax}} \left\{ w_k \log_2 \left( 1 + \frac{\left| u_d^H H_{s_d} \Pi^{(d)} v_d \right|^2 \frac{P}{d}}{u_d^H \check{C}_{s_d} u_d} \right) \right\}$$

$$\Pi^{(d+1)} = \Pi^{(d)} - v_d v_d^H$$

end find power allocation $p$ by waterfilling

Algorithm 1: SESAM

FIG 3
PRIOR ART $$\Pi^{(1)} = I$$
for $d = 1 \ldots, N_{tx}$ do $$(s_d, u_d, v_d) = \underset{\substack{s_d \in \mathcal{K} \\ u_d^H u_d = 1 \\ v_d^H v_d = 1}}{\operatorname{argmax}} \left\{ w_k \log_2 \left( 1 + \frac{\left| u_d^H H_{s_d} \Pi^{(d)} v_d \right|^2}{u_d^H \tilde{C}_{s_d} u_d} \frac{P}{d} \right) \right\}$$

$$H_{\text{comp}} = \begin{bmatrix} u_1^H H_{s_1} \\ \vdots \\ u_d^H H_{s_d} \end{bmatrix}$$

$V = H_{\text{comp}}^H \left( H_{\text{comp}} H_{\text{comp}}^H \right)^{-1} \Lambda$, where $\Lambda$ is chosen such that $v_d^H v_d = 1 \ \forall d$
find power allocation $p$ by waterfilling
if $w^T r(\mathcal{D}^{(d)}) < w^T r(\mathcal{D}^{(d-1)})$ then
| return $\mathcal{D}^{(d-1)}$
end
$\Pi^{(d+1)} = \Pi^{(d)} - v_d v_d^H$
end

Algorithm 2: LISA

FIG 4

PRIOR ART $$s_1 = \underset{s_1 \in \mathcal{K}}{\operatorname{argmax}} \left\{ w_{s_1} \log_2 \left( 1 + \frac{\|h_{s_1}\|_2^2 \frac{P}{N_{tx}}}{\tilde{c}_{s_1}^2} \right) \right\}$$

$$v_1 = \frac{h_{s_1}}{\|h_{s_1}\|_2}$$

compute orthonormal basis $V$ by Gram-Schmidt orthogonalization from $v_1$ for $d = 2, \ldots, N_{tx}$ do

$$s_d = \underset{s_d \in \mathcal{K} \setminus \mathcal{S}}{\operatorname{argmax}} \left\{ w_{s_d} \log_2 \left( 1 + \frac{|h_{s_d}^H v_d|^2 \frac{P}{N_{tx}}}{\tilde{c}_{s_d}^2 + \|h_{s_d}\|_2^2 \frac{P}{N_{tx}} - |h_{s_d}^H v_d|^2 \frac{P}{N_{tx}}} \right) \right\}$$

stopping criterion end

Algorithm 3: Algorithm similar to Algorithm A in [19]

FIG 5
PRIOR ART

```
for k ∈ K do
    s₁ = k
    v₁ = hₖ / ||hₖ||₂
    determine datastreams 𝒟ₖ
        compute orthonormal basis V by Gram-Schmidt orthogonalization from v₁
        for d = 2, …, N_tx do
            s_d = argmax     { w_{s_d} log₂ ( 1 + |h^H_{s_d} v_d|² P/N_tx  /  ( c̃²_{s_d} + ||h_{s_d}||²₂ P/N_tx − |h^H_{s_d} v_d|² P/N_tx ) ) }
                 s_d∈K\S
            stopping criterion
        end
    end
end
𝒟 = argmax { w^T r(𝒟ₖ) }
    k∈K
```

Algorithm 4: Algorithm similar to Algorithm B in [19]

FIG 6
PRIOR ART

```
Π^(1) = I
for d = 1…, N_tx do
    (s_d, v_d) =     argmax         { w_{s_d} log₂ ( 1 + (P/N_tx)|h^H_{s_d} Π^(d) v_d|²  /  ( c̃²_{s_d} + P/N_tx ||h_{s_d}||²₂ − P/N_tx |h^H_{s_d} Π^(d) v_d|² ) ) }
                 s_d∈K\S, v_d^H v_d=1
    stopping criterion
    Π^(d+1) = Π^(d) − v_d v_d^H
end
```

Algorithm 5: Algorithm similar to Algorithm in [20]

FIG 7
PRIOR ART

```
for k ∈ 𝒦 do
    (V_k, D_k) by EVD such that V_k D_k V_k^H = H_k^H H_k and V_k V_k^H = I
end
(s_1, i) = argmax_{k ∈ 𝒦, i=1,...,N_tx} {D_k(i,i)}
V = V_{s_1}
v_1 = v_i
u_1 = (v_1^H H_{s_1}^H) / ‖v_1^H H_{s_1}^H‖     (normalized MRC receive filter)
for d ∈ {1,...,N_tx} \ i do
    s_d ∈ argmax_{s_d ∈ 𝒦\𝒮} { w_{s_d} log_2 ( 1 + (|v_d^H H_{s_d}^H H_{s_d} v_d|^2 P/N_tx) / ( v_d^H H_{s_d}^H C̄_{s_d} H_{s_d} v_d + ‖v_d^H H_{s_d}^H H_{s_d}‖^2 P/(2N_tx) − |v_d^H H_{s_d}^H H_{s_d} v_d|^2 P/N_tx ) ) }
    u_{s_d} = (H_{s_d} v_d) / ‖H_{s_d} v_d‖      (normalized MRC receive filter)
    stopping criterion
end
```

Algorithm 6: Algorithm in similar to Algorithm in [21]

FIG 8
PRIOR ART

| Method | global optimal | local optimal | low-complexity |
|---|---|---|---|
| MIMO-DPC | MIMO BC-MAC Duality [4,5] | | SESAM [9, 10] |
| MISO-DPC | | | |
| MIMO-lin. | open problem [6, 7] | [8] | LISA [11, 12, 13] |
| MISO-lin. | | | |
| Unitary-MIMO-DPC | Minimax Uplink-downlink Duality [14] | | SESAM (equal power) |
| Unitary-MISO-DPC | | | |
| Unitary-MIMO-lin. | open problem | open problem | [21], Unitary-LISA |
| Unitary-MISO-lin. | [16] (2 User) | [17, 18] | [19, 20] |

Table 1.1: Overview Alternative Techniques

FIG 9

$\Pi^{(d)} = I$ ← 1410 for $d = 1, \ldots, N_{tx}$ do

$(s_d, v_d) = \underset{\substack{s_d \in \mathcal{K} \\ v_d^H v_d = 1}}{\operatorname{argmax}} \left\{ \underbrace{-w_{s_d} \log_2 \left(1 - \underbrace{\frac{P}{N_{tx}} v_d^H \Pi^{(d),H} H_{s_d}^H C_{\eta,s_d}^{-1} H_{s_d} \Pi^{(d)} v_d}_{1432} \right)}_{1430} \right\}$ $u_d = \dfrac{C_{\eta,s_d}^{-1} H_{s_d} v_d}{\|C_{\eta,s_d}^{-1} H_{s_d} v_d\|_2}$ optional stopping criterion ← 1440, 1450

$\Pi^{(d+1)} = \Pi^{(d)} - v_d v_d^H$ ← 1460 end

1420

Algorithm 7: Unitary-LISA

FIG 14

Figure 1.1: LISA - effect of unknown interference

Figure 1.2: LISA - effect of unknown interference - zoom

Figure 1.3: Unitary-LISA vs. State-Of-The-Art

TRANSMISSION FILTER CALCULATOR, COMMUNICATION DEVICE AND METHODS

RELATED APPLICATIONS

This application claims priority under 35 U.S.C. §119 to European Patent Application No. 12162634.5 filed on Mar. 30, 2012, the entire content of which is hereby incorporated by reference.

BACKGROUND OF THE INVENTION

Embodiments according to the invention are related to a transmission filter calculator, a method for calculating a transmission filter, a communication device, a method for operating a communication device and to computer programs.

An embodiment according to the invention is related to an adaptive unitary precoding for multicell multiple-input-multiple-output (MIMO) communications.

Embodiments according to the invention are useable in the field of wireless communications. Further embodiments according to the invention are related to the field of transmission technology. Some embodiments according to the invention are related to the field of cooperative multi-point (CoMP) transmission. Some embodiments according to the invention are related to the field of orthogonal beamforming. Some embodiments according to the invention are related to a MIMO downlink.

In the following, some application scenarios which occur in current communication networks like, for example, mobile communication networks, will be described. In particular, a target configuration in which embodiments according to the invention can be advantageously applied will be described.

In many communication environments there are multiple users in a multicell/cooperative multi-point (CoMP) system.

One of the challenges in such a system is the downlink transmission in the multiuser multicell/CoMP system. In this case, there is a so-called "interference network". For example, there is a very significant interference level due to the presence of multiple base stations (and possibly also multiple mobile stations). Also, advanced multiple-input-multiple-output transmission is often applied in such systems, which increases the complexity. Furthermore, there is often unknown inter-cell interferences, which also makes it more difficult to choose proper communication parameters.

A graphical representation of a typical communication environment, in which embodiments according to the present invention may be applied, is shown in FIG. 1.

In view of such communication environments, it is a goal to reduce uncertainty in interference to obtain more robust downlink strategies.

Moreover, it should be noted that cell-edge users experience inter-cell interference in many modern communication environments. Inter-cell interference of mobile communication devices which are in the proximity of a cell-edge are shown in FIG. 2, which shows a graphical representation of such a scenario.

It has been found that for MIMO transmission, the spatial signature of the interference is typically unknown. It has also been found that this causes problems for link adaptation and algorithmic impairments in higher layers (like, for example, scheduler and resource allocation, for example fractional reuse).

In view of this situation, it is a goal to have robust MIMO downlink strategies and to solve the above mentioned problems.

In the following, some alternative solutions will be described.

For example, a so-called "codebook-based MIMO" concept may be used. An example of such a concept is known as "PU2RC". In this concept, a unitary codebook makes interference well-predictable. However, it has been found that said concept does not exploit the full capabilities a of multiuser multiple-input-multiple-output approach.

Another alternative solution is the so-called "advanced multiuser MIMO" (also briefly designated as "MU-MIMO"). This concept uses an adaptive precoding. Moreover, low complexity solutions are available like, for example, a solution called "SESAM" (see, for example, reference [B3]) and a solution called "LISA" (see, for example, reference [B4]). In this advanced multiuser MIMO, robustness is typically achieved either by a second pilot (which constitutes an additional overhead) or by conservative rate adaptation (which brings along a performance loss). For details, reference is made to reference [B1]).

However, it has been found that codebook based approaches do not exploit the full potential of MU-MIMO. Moreover, it has been found that robustness for adaptive MIMO causes additional overhead in alternative implementations. Also, it has been recognized that it is difficult to find optimal receivers, which has a huge impact on performance. Thus, it can be seen that alternative solutions comprise a number of problems and limitations.

In the following, some recent advances will be briefly summarized.

Several concepts for adaptive unitary precoding have been found. For example, references is made to documents [B6] to [B10]. The concepts use adaptive precoding and it has been found that interference is well predictable. However, an optimal solution is not available for linear precoding. Also, it has been found that it is difficult to optimize (for example, because the optimization problem is non-convex and combinatorial). Moreover, it has been found that low complexity solutions are only available for single antenna receivers.

In view of the above discussion, it is an object of the present invention to create an efficient concept for communicating in a multicell multi-input-multi-output communication environment.

SUMMARY OF THE INVENTION

An embodiment may have a transmission filter calculator for calculating at least a transmit filter for a communication from a transmit communication device including a plurality of antennas to a receive communication device out of a plurality of receive communication devices including a plurality of antennas via a multiple-input-multiple-output channel, wherein the transmission filter calculator is configured to iteratively determine transmit filters for a plurality of data streams, wherein the transmission filter calculator is configured to choose a transmit filter in a given iteration such that the transmit filter chosen in the given iteration is orthogonal to one or more transmit filters chosen in one or more previous iterations, and such that a weighted or unweighted transmission rate obtainable using the transmit filter chosen in the given iteration is maximized, and wherein the transmission filter calculator is configured to choose the transmit filter in dependence on a matrix product term which is based on a channel matrix describing MIMO channel characteristics between the transmit communication device and a currently considered one of the receive communication devices and on a distortion covariance matrix describing a noise, an inter-cell interference and an upper limit of an intra-cell interference.

Another embodiment may have a method for calculating at least a transmit filter for a communication from a transmit communication device including a plurality of antennas to a receive communication device out of a plurality of receive communication devices including a plurality of antennas via a multiple-input-multiple-output channel, wherein the method includes iteratively determining transmit filters for a plurality of data streams, wherein a transmit filter is chosen in a given iteration such that the transmit filter chosen in the given iteration is orthogonal to one or more transmit filters chosen in one or more previous iterations, and such that a weighted or unweighted transmission rate obtainable using the transmit filter chosen in the given iteration is maximized, and wherein the transmit filter is chosen in dependence on a matrix product term which is based on a channel matrix describing MIMO channel characteristics between the transmit communication device and a currently considered one of the receive communication devices and on a distortion covariance matrix describing a noise, an inter-cell interference and an upper limit of an intra-cell interference.

Another embodiment may have a communication device for communicating with a transmit communication device in the presence of one or more interferer communication devices, wherein the communication device is configured to determine a channel matrix describing MIMO channel characteristics between the communication device and the transmit communication device, and to also determine one or more channel matrices describing MIMO channel characteristics between the communication device and the one or more interferer communication devices, and wherein the communication device is configured to determine a matrix product which is based on the channel matrix describing a MIMO channel between the communication device and the transmit communication device and on a distortion covariance matrix describing a noise, an inter-cell interference and an upper limit of an intra-cell interference, to obtain a product matrix, and wherein the communication device is configured to transmit the product matrix to the transmit communication device.

Another embodiment may have a method for operating a communication device for communicating with a transmit communication device in the presence of one or more interferer communication devices, wherein the method includes determining a channel matrix describing MIMO channel characteristics between the communication device and the transmit communication device, determining one or more channel matrices describing MIMO channel characteristics between the communication device and the one or more interferer communication devices, and wherein the method includes determining a matrix product which is based on the channel matrix describing a MIMO channel between the communication device and the transmit communication device and on a distortion covariance matrix describing a noise, an inter-cell interference and an upper limit of an intra-cell interference, to obtain a product matrix, and wherein the method includes transmitting the product matrix to the transmit communication device.

Another embodiment may have a computer program for performing the inventive methods when the computer program runs on a computer.

An embodiment according to the invention creates a transmission filter calculator for calculating at least a transmit filter for a communication from a transmit communication device comprising a plurality of antennas to a receive communication device out of a plurality of receive communication devices comprising a plurality of antennas via a multiple-input-multiple-output (MIMO) channel. The transmission filter calculator is configured to iteratively determine transmit filters for a plurality of data streams, wherein the transmission filter calculator is configured to choose a transmit filter in a given iteration such that the transmit filter chosen in the given iteration is orthogonal to one or more transmit filters chosen in one or more previous iterations, and such that a weighted or unweighted transmission rate obtainable using the transmit filter chosen in the given iteration is maximized. Also, the transmission filter calculator is configured to choose the transmit filter in dependence on a matrix product term which is based on a channel matrix describing MIMO channel characteristics between the transmit communication device and a currently considered one of the receive communication devices and which is also based on a distortion covariance matrix describing a noise, an inter-cell interference and an upper limit of an intra-cell interference.

It is a key idea of the present invention that the usage of a matrix product term, which is based on the channel matrix describing MIMO channel characteristics between the transmit communication device and a currently considered one of the receive communication devices and which is based on a distortion covariance matrix describing a noise, an inter-cell interference and an upper limit of an intra-cell interference in a transmission filter calculator which ensures that a transmit filter chosen in a given iteration is orthogonal to one or more transmit filters chosen in one or more previous iterations allows for an efficient low-complexity iterative algorithm for a calculation of transmission filters, wherein the resulting transmit filters (which are described by transmit filter vectors) result in a good usage of the available resources.

It has been found that this concept allows for an extension of unitary precoding to multiple receive antennas with moderate complexity. Moreover, it has been found that no additional feedback is necessitated using the above described concept. Also, it has been found that an optimal, or at least almost optimal, rate adaptation is possible since the distortion covariance matrix describing a noise, an inter-cell interference and an upper limit of an intra-cell interference is very well-suited for this purpose and at the same time allows for a computationally efficient formulation of the algorithm for the transmit filter calculation. Moreover, the concept described above also allows for a computationally efficient provision of optimal (or almost optimal) receive filters.

To conclude, the usage of the matrix product term, as described above, in an iterative calculation of transmit filters allows for an efficient algorithm which nevertheless brings along very good results which cause a good usage of the radio resources.

In an embodiment, the transmission filter calculator is configured to choose the transmit filter in a given iteration using a projector matrix, and to update the projector matrix in response to a choice of a transmit filter, such that Eigenvectors associated with non-zero Eigenvalues of the updated projector matrix are orthogonal to transmit filters (or, more precisely, to transmit filter vectors describing transmit filters) chosen in previous iterations and in the current iteration. It has been found that the application of a projector matrix in a iterative algorithm allows for a particularly efficient choice of orthogonal transmit filters (or, more precisely, transmit filter vectors) while avoiding the efficiency restrictions implied by a usage of a predetermined set of orthogonal transmit filters. In other words, usage of the projector matrix allows to choose the best transmit filter vector (describing a transmit filter) in each iteration (under the restriction that the chosen transmit filter vector has to be orthogonal to previously chosen transmit filter vectors).

In an embodiment, the transmission filter calculator is configured to initialize the projector matrix to be an identity matrix, or a multiple thereof, prior to an iterative determination of transmit filters for a plurality of data streams. The transmission filter calculator is configured to subtract a matrix defined by an outer product of a chosen transmit filter vector and a transposed version of the chosen transmit filter vector (describing the chosen transmit filter) from the projector matrix (used in the current iteration), to obtain the updated projector matrix (to be used in the next iteration). Accordingly, a particularly efficient mechanism is created for ensuring the orthogonality of transmit filter vectors chosen in subsequent iterations.

In an embodiment, the transmission filter calculator is configured to determine the weighted transmission rate associated with a currently considered one of the receive communication devices in dependence on a matrix product term which is based on the projector matrix of a current iteration, the channel matrix associated with the currently considered one of the receive communication devices and the distortion covariance matrix associated with the currently considered one of the receive communication devices. This embodiment is based on the finding that such a matrix product term, which is based on the projector matrix of the current iteration, the channel matrix associated with the currently considered one of the receive communication devices and the distortion covariance matrix associated with the currently considered one of the receive communication devices, allows for a simple derivation of a transmission rate.

In an embodiment, the transmission filter calculator is configured to determine a largest Eigenvalue of the matrix product term which is based on the projector matrix of the current iteration, the channel matrix associated with the currently considered one of the receive communication devices and the distortion covariance matrix associated with the currently considered one of the receive communication devices, in order to determine the weighted or unweighted transmission rate obtainable for the currently considered one of the receive communication devices. Moreover, the transmission filter calculator is configured to determine a selected receive communication device on the basis of a determination of weighted or unweighted transmission rates obtainable for a plurality of receive communication devices. Moreover, the transmission filter calculator is configured to determine an Eigenvector of the matrix product term based on the projector matrix of the current iteration, the channel matrix associated with the currently considered one of the receive communication devices and the distortion covariance matrix associated with the currently considered one of the receive communication devices, in order to obtain the transmit filter (or transmit filter vector) associated with a data stream to the receive communication device selected in the current iteration. It has been found that the evaluation of both the Eigenvalues and the Eigenvectors of said matrix product term allows for a computationally efficient way of iteratively selecting orthogonal transmit filters (or orthogonal transmit filter vectors describing said transmit filters) while at the same time making good usage of the available channel resources and avoiding a large waste of resources.

In an embodiment, the transmission filter calculator is configured to compare, in an iteration, maximum weighted or unweighted transmission rates obtainable for a plurality of receive communication devices in view of the condition that the transmit filter to be chosen in the current iteration is orthogonal to all transmit filters chosen in one or more previous iterations, and to select, in an iteration, a receive communication device and a corresponding transmit filter for a data stream. A simultaneous choice of a receive communication device and a corresponding transmit filter for a data stream towards the chosen receive communication device provides for a high efficiency of the algorithm.

In an embodiment, the transmission filter calculator is configured to obtain the maximum weighted or unweighted transmission rates obtainable for the plurality of receive communication devices on the basis of respective largest Eigenvalues of matrix product terms based on a projector matrix of the current iteration, a channel matrix associated with the currently considered one of the receive communication devices and the distortion covariance matrix associated with the currently considered one of the receive communication devices. It has been found that this procedure is particularly efficient since the determination of largest Eigenvalues is possible using computationally efficient algorithms.

In an embodiment, the transmission filter calculator is configured to use, as the distortion covariance matrix associated with a given one of the receive communication devices, a distortion covariance matrix which is based on noise information describing a noise effective for the given one of the receive communication devices, based on a channel matrix describing MIMO channel characteristics between the given one of the receive communication devices and the transmit communication device, and based on one or more channel matrices describing MIMO channel characteristics between the given one of the receive communication devices and one or more interference communication devices. It has been found that such a choice of the distortion covariance matrix allows for a consideration of different types of distortion, namely a noise, an inter-cell interference and an intra-cell interference, within a single matrix. Also, it has been found that such a choice of a distortion covariance matrix allows for the provision of transmit filters (or transmit filter vectors) which are very well adapted to the communication environment.

In an embodiment, the transmission filter calculator is configured to use, as the matrix product term for choosing the transmit filter, a matrix product term received from a currently considered one of the receive communication devices by the transmit communication device (which comprises the transmission filter calculator). It has been found that the matrix product term can already be computed at the side of a receive communication device, which makes the transmission of the necessitated information from the receive communication device to the transmit communication device resource-efficient.

In an embodiment, the transmission filter calculator is configured to determine receive filters for a plurality of data streams. The transmission filter calculator is configured to choose a receive filter in a given iteration on the basis of the distortion covariance matrix associated with the receive communication device selected in the given iteration, on the basis of the channel matrix associated with the receive communication device selected in the given iteration and in dependence on the transmit filter chosen in the given iteration. Accordingly, there is a simple computational rule for the determination of the receive filter, which again improves the efficiency of the algorithm.

An embodiment according to the invention creates a method for calculating at least a transmit filter for a communication from a transmit communication device to a receive communication device. The method is based on the same ideas as the transmission filter calculator.

An embodiment according to the invention creates a communication device (for example, a receive communication device, a mobile communication device, or the like) for communicating with a transmit communication device in the presence of one or more interferer communication devices. The communication device is configured to determine a channel matrix describing MIMO channel characteristics between the communication device and the transmit communication device, and to also determine one or more channel matrices describing MIMO channel characteristics between the communication device and the one or more interferer communication devices. The communication device is also configured to determine a matrix product which is based on the channel matrix describing a MIMO channel between the communication device and the transmit communication device and on a distortion covariance matrix describing a noise, an inter-cell interference and an upper limit of an intra-cell interference, to obtain a product matrix. The communication device is configured to transmit the product matrix to the transmit communication device.

This communication device is based on the finding that it is particularly efficient to transmit the matrix product, as defined above, from the communication device (for example, receive communication device, mobile communication device, or the like) to the transmit communication device. In other words, it has been found that it is not necessitated to transmit each individual information item (like, for example, the individual channel matrices or the individual distortion covariance matrix) from the communication device (for example, receive communication device, mobile communication device, or the like) to the transmit communication device. Rather, it has been found that the combined information is sufficient for the transmit communication device to obtain a transmit filter information (like, for example, a transmit filter vector describing a transmit filter) which brings along an efficient usage of the radio resources.

In an embodiment, the communication device (for example, receive communication device, mobile communication device, or the like) is configured to obtain the distortion covariance matrix on the basis of a noise information describing a noise effective for the communication device (for example, receive communication device, mobile communication device, or the like), on the basis of the channel matrix describing the MIMO channel characteristics between the communication device (for example, receive communication device, mobile communication device, or the like) and the transmit communication device, and on the basis of the one or more channel matrices describing the MIMO channel characteristics between the communication device (for example, receive communication device, mobile communication device, or the like) and the one or more interferer communication devices. It has been found that the derivation of an appropriate distortion covariance matrix can be done on the basis of information which can be obtained by a communication device like, for example, a mobile communication device or the like, with relatively small effort.

An embodiment according to the invention creates a method for operating a communication device. Said method is based on the same ideas as the communication device discussed above.

Other embodiments according to the invention create a computer program for performing one of the above discussed methods when the computer program runs on a computer.

BRIEF DESCRIPTION OF THE DRAWINGS

Embodiments of the present invention will be detailed subsequently referring to the appended drawings, in which:

FIG. 3 shows a representation of an algorithm named "SESAM";

FIG. 4 shows a representation of an algorithm named "LISA";

FIG. 5 shows a representation of an algorithm which is similar to an algorithm "A" in reference [19];

FIG. 6 shows a representation of an which is similar to an algorithm "B" in reference [19];

FIG. 7 shows a representation of an algorithm which is similar to an algorithm from reference [20];

FIG. 8 shows a representation of an algorithm which is similar to an algorithm from reference [21];

FIG. 9 shows a table describing different alternative algorithms;

FIG. 14 shows a representation of an algorithm named "Unitary-LISA";

DETAILED DESCRIPTION OF THE PREFERRED EMBODIMENTS

Figure 1:
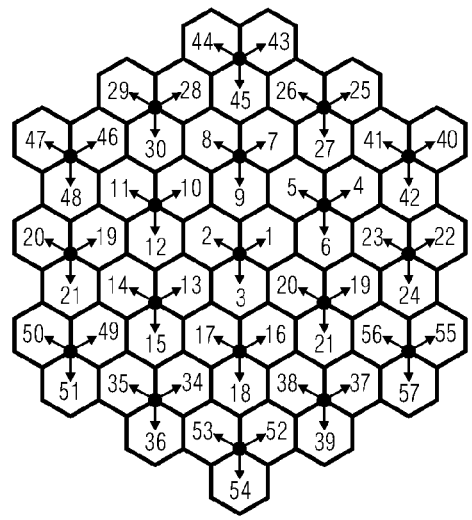
FIG. 1 shows a schematic representation of a communication environment in which embodiments according to the invention can be used.
Figure 2:
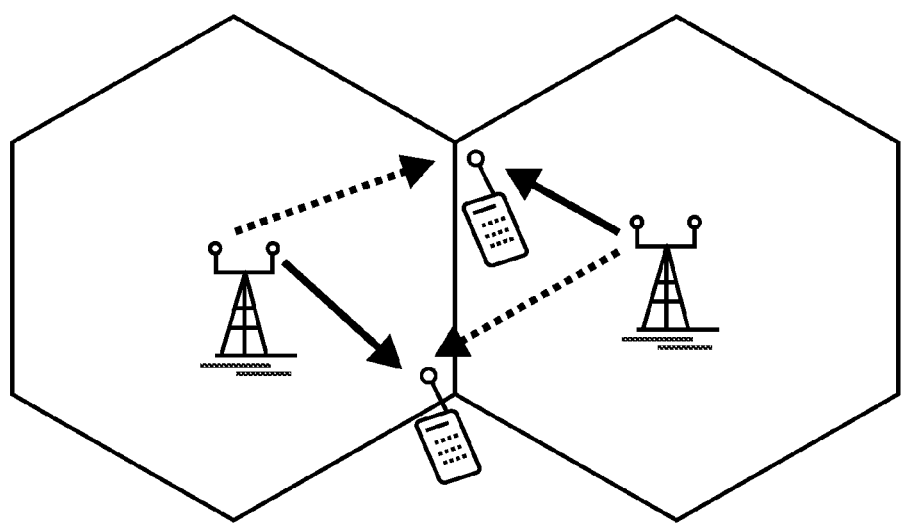
FIG. 2 shows a graphic representation of a scenario in which mobile communication devices are located in the proximity of cell borders of a communication cell.

A brief introduction into the problem underlying the embodiments according to the invention will be provided and alternative solutions will be discussed. Subsequently, a detailed discussion of embodiments according to the invention will be provided and simulation results will be provided. Finally, conclusions will be given.

1. Problem and Alternative Solutions

The scenario described in the following may be a scenario in which a communication device comprising the transmission filter calculator according to the present invention may be operated. Moreover, the communication devices defined herein may operate in the scenario described in the following.

It should be noted here that the description sometimes distinguishes between "transmitters" (also designated as "transmit communication devices") and receivers (also designated as "receive communication devices" or "user communication devices" or briefly "communication devices"). However, it should be noted that even a device designated as a transmitter or a transmit communication device may naturally also comprise some reception functionality. In many cases, a transmitter or a transmit communication device is part of a transceiver or a transceiver communication device. Similarly, a receiver or a receive communication device may be part of a respective transceiver communication device. Accordingly, the designation "transmit communication device" and "receive communication device" is primarily used to describe a current role of the respective communication device, wherein however the roles may change. However, a "transmit communication device" may typically be configured to establish communication with a plurality of "receive communication devices". Accordingly, in some embodiments a "transmit communication device" may be a base station of a communication network, or the like, and a "receive communication device" may be a mobile station of a communication network.

In wireless networks the quality of the received signal, and therefore the data rate of the user, depends on the transmit strategy chosen, the properties of the wireless channel, noise level, and interference. The interdependence of the data rates of the users due to interference and limited resources makes it difficult to optimize the physical layer parameters, which is especially challenging in MIMO networks, as the availability of additional degrees of freedom is directly reflected in the spatial signature of the interference.

In general, the exact transmit covariance matrix of the other transmitters cannot be predicted correctly in advance as the optimal transmission strategies mutually depend on each other. Here we regard the case were users are served while being affected by inter-cell interference and assume that the set of interfering transmitters I is given.

We do not regard further interference coordination among the involved transmitters and therefore each transmitter (for example, a transmit communication device comprising the transmit filter calculator according to the present invention) chooses the best transmit strategy for its users egoistically.

For networks where each transmitter is equipped with a single antenna it is clear that the strategy of each transmitter is to use all available power, which makes the interference caused to each user very well predictable, for example by measurements. As in the single antenna case, for multiple transmit antennas each transmitter will use its full power budget, however the spatial signature of the interference is difficult to predict. The noise plus inter-cell interference covariance matrix $C_k \in \mathbb{C}^{N_{rx} \times N_{rx}}$ of user k with $N_{rx}$ receive antennas is given by $$C_k = \sigma^2 I + \sum_{t \in I} H_{kt} Q_t H_{kt}^H,$$

where $\sigma^2 I$ is the receiver noise covariance, $Q_t \in \mathbb{C}^{N_{tx} \times N_{tx}}$ is the transmit covariance of transmitter t with $N_{tx}$ transmit antennas, and $H_{kt} \in \mathbb{C}^{N_{rx} \times N_{tx}}$ is the channel matrix from transmitter t to user k. In case $C_k$ is known for every user, so called interference awareness, it is known how to compute the capacity achieving transmit strategies, see Section 1.2. However, it is clear that the transmit strategies chosen mutually depend on each other, meaning one does not know the inter-cell interference in advance and the unpredictability of the interference causes problems for link rate adaptation. The degradation of the transmission rates due to unexpected changes of the inter-cell interference is sometimes called "flash-light" effect [1] and several ideas are suggested to handle the problem [2]. Additionally, the uncertainty in interference results in uncertainty in the presumed achievable data rates of the users, which in turn causes impairments at the higher layers, for example the scheduler.

An alternative approach is to use a prediction of the inter-cell interference based on either measured inter-channel-interference ICI in the past [2], or based on knowledge of the cross-channels.

It has been found that in case the users are able to gather correct channel state information on the channels to the interfering transmitters, a prediction that performs well is to assume a white transmit covariance using the full power budget:

$$\tilde{Q}_t = \frac{P}{N_{tx}} I \forall t \in \mathcal{I}.$$

The predicted interference plus noise covariance is then given by $$\tilde{C}_k = \sigma^2 I + \frac{P}{N_{tx}} \sum_{t \in I} H_{kt} H_{kt}^H. \qquad (1.1)$$

In Section 1.1, it will be discussed how MIMO downlink strategies can be parameterized, that is the mapping of physical layer parameters to data rates. In Section 1.2., algorithms to select transmission strategies in order to maximize a weighted sum of the data rates (WSR) will be briefly discussed. Further, it will be discussed how the incorrect prediction of the interference affects the performance. To reduce the uncertainty in the prediction we can enforce a white transmit covariance at every transmitter. Several known strategies that result in a white transmit covariance matrix will be discussed in Section 1.2. Finally, alternative methods will be summarized and the relationship to the embodiments according to the invention will be discussed.

1.1 MIMO Downlink Strategies

In the following, some assumptions and definitions underlying embodiments according to the invention will be described.

As described in the previous Section, we assume that the interdependence of the data rates due to interference is considered by a prediction of the interference. This decouples the problem of finding optimal downlink strategies into a problem per transmitter, in the following we therefore omit the affiliation to a specific transmitter and regard a single cell, where the set of users is K, K=|K|.

The transmitter (which may be considered as a communication device or transmit communication device, and which may comprise a transmission filter calculator) has $N_{tx}$ antennas and the number of receive antennas of user k is $N_{rx,k}$. The receiver of user k may be considered as a "communication device" or "user communication device" or "receive communication device". For clearer notation, but without loss of generality, we assume that all users (or all receive communication devices, or all user communication devices) have the same number of receive antennas $N_{rx,k} = N_{rx} \forall k \in K$. The downlink channel matrices are $H_1, \ldots, H_K \in \mathbb{C}^{N_{rx} \times N_{tx}}$. The predicted interference for user k is $\tilde{C}_k$ for example given by (1.1). We target the optimization of a weighted sum $\Sigma_{k \in K} w_k r_k = w^T r$ of the user data rates $r = [r_1, \ldots, r_k]^T$, where the weights are given by $w = [w_1, \ldots, w_k]^T$.

1.1.1 Parameterization in Transmit Covariances

Gaussian input signals and DPC are capacity achieving for the Gaussian multiple input multiple output (MIMO) broadcast channel [4], therefore the downlink strategies are fully described by the $N_{tx} \times N_{tx}$ downlink transmit covariance matrices $Q_1, \ldots, Q_K$ and the encoding order. The covariances are necessitated to be positive semidefinite, which we denote as $Q_k \succeq 0 \forall k \in \mathcal{K}$. Assuming the users are sorted according to the encoding order, the data rate of user k is given by $$r_k = \log_2 \det\left(I + \left(\tilde{C}_k + H_k \sum_{i>k} Q_i H_k^H\right)^{-1} H_k Q_k H_k^H\right). \tag{1.2}$$

In case of linear precoding the data rate of user k is given by $$r_k = \log_2 \det\left(I + \left(\tilde{C}_k + H_k \sum_{i \in \mathcal{K} \setminus k} Q_i H_k^H\right)^{-1} H_k Q_k H_k^H\right). \tag{1.3}$$

For users equipped with a single antenna (MISO), $N_{rx}=1$, channel coefficients are usually noted as column vectors. Instead of $H_k \in \mathbb{C}^{1 \times N_{tx}}$ we write $h_k = H_k^T \in \mathbb{C}^{N_{tx}}$. The noise plus inter-cell interference covariance $C_k$ is a scalar, denoted as $c_k^2$. For so-called dirty paper coding DPC the rate expression (1.2) simplifies to $$r_k = \log_2\left(1 + \frac{h_k^H Q_k h_k}{\tilde{c}_k^2 + \sum_{i>k} h_k^H Q_i h_k}\right)$$

and for linear precoding the rate expression (1.3) becomes $$r_k = \log_2\left(1 + \frac{h_k^H Q_k h_k}{\tilde{c}_k^2 + \sum_{i \in \mathcal{K} \setminus k} h_k^H Q_i h_k}\right).$$

1.1.2 Parameterization by Datastreams

Any rate configuration achievable by the transmit covariance parameterization, see Section 1.1.1, can alternatively be achieved by transmitting data streams over scalar channels that are established by transmit and receive filters. Low-complexity solutions often target to find an efficient data stream set directly. The filters are chosen as normalized vectors, i.e. $u_d^H u_d = 1$ and $v_d^H v_d = 1$, so each stream d is described by the assignment to a user $s_d \in \mathcal{K}$, receive filter $u_d \in \mathbb{C}^{N_{rx}}$, transmit filter $v_d \in \mathbb{C}^{N_{tx}}$, and power allocation $p_d \in \mathbb{R}_+$. We define a set of data streams $\mathcal{D}=(S, U, V, p)$, $D=|\mathcal{D}|$, where the set of active users is given by $S=\{s1, \ldots, s_D\}$, the set of receive filters is $U=\{u1, \ldots, u_D\}$, the transmit filters are collected in a matrix $V=[v_1, \ldots, v_D] \in \mathbb{C}^{N_{tx} \times D}$, and the power allocation is denoted as $p=[p_1, \ldots, p_D]^T \in \mathbb{R}_+^D$.

For DPC the rate of a data stream d can be calculated as $$r_d = \log_2\left(1 + \frac{|u_d^H H_{s_d} v_d|^2 p_d}{u_d^H \tilde{C}_{s_d} u_d + \sum_{i>d} |u_d^H H_{s_d} v_i|^2 p_i}\right), \tag{1.4}$$

where we assumed that the data streams are sorted according to the encoding order. For linear precoding, the data rate is $$r_d = \log_2\left(1 + \frac{|u_d^H H_{s_d} v_d|^2 p_d}{u_d^H \tilde{C}_{s_d} u_d + \sum_{i \in \mathcal{D} \setminus d} |u_d^H H_{s_d} v_i|^2 p_i}\right), \tag{1.5}$$

For single antenna receivers we have $$r_d = \log_2\left(1 + \frac{|h_{s_d}^H v_d|^2 p_d}{\tilde{c}_{s_d}^2 + \sum_{i>d} |h_{s_d}^H v_i|^2 p_i}\right), \tag{1.6}$$

for the case of DPC and for linear precoding the rate is $$r_k = \log_2\left(1 + \frac{|h_{s_d}^H v_d|^2 p_d}{\tilde{c}_{s_d}^2 + \sum_{i \in \mathcal{D} \setminus d} |h_{s_d}^H v_i|^2 p_i}\right), \tag{1.7}$$

Note that some relevant downlink strategies investigated are designed for receivers with a single receive antenna. We describe these algorithms for single antenna receivers, for the numerical simulations we extend these results to handle multiple receive antennas.

It should be noted that a transmit filter $v_d$ (or, more precisely, a transmit filter described by a transmit filter vector $v_d$) associated to a data stream describes how a signal representing the data stream d is assigned to a plurality of antennas. Each entry of the transmit filter vector $v_d$ describes how a signal representing the data stream is assigned to a single antenna out of a plurality of antennas.

1.2 Algorithms—Transmission Power Constraint

Usually the weighted sum rate optimization is subject to a power constraint, that is $$\sum_{k \in \mathcal{K}} tr\{Q_k\} \leq P$$

for the parameterization in transmit covariances, see Section 1.1.1, and $$\sum_{d \in \mathcal{D}} p_d \leq P$$

for the data stream formulation, see Section 1.1.2.

In the following, some alternative algorithms will be described to facilitate the understanding.

In case of DPC the global optimal transmit covariances can be efficiently computed via BCMAC Duality [4, 5], for both multiple receive antennas (MIMO) and single receive antennas (MISO). For linear precoding and MIMO the global optimal solution is an open problem. For MISO case a global optimal solution can be computed by methods for global optimization [6, 7]. However, these methods have high complexity and are not applicable for a larger number of users or online implementation. An approach for local optimal solutions, for both MIMO and MISO, can be found in [8].

SESAM [9, 10] and LISA [11, 12, 13] are low complexity algorithms that directly select the data streams, where transmit and receiver filters are chosen to completely eliminate intra-cell interference (zero-forcing). In the following, we briefly describe the algorithms, for details we refer to [9, 10] and [11, 12, 13]. Both algorithms successively allocate data streams under the condition that the newly added stream does not interfere with the previous data streams, this implies orthogonal transmit filters. This orthogonality is assured by a projector matrix II, which is also successively updated. For SESAM the remaining interference is canceled by DPC. For LISA an additional zero-forcing step to update the transmit filters (the receive filters are kept fixed) is necessitated. The optimal power allocation over the now orthogonal scalar channels is found by waterfilling. SESAM will allocate the maximal number of data streams, usually $N_{tx}$, as adding new streams does not decrease the weighted sum-rate as the gains of scalar channels of the previous data streams are not altered. This is different for the LISA algorithm, where the zero-forcing step affects all channels, which could lead to a decrease of the weighted sum-rate. Therefore, after a new data stream is added a check if the performance is increased is performed and in case of a decrease, meaning $$w^T r(D^{(d)}) < w^T r(D^{(d-1)}). \quad (1.8)$$

the algorithm is interrupted and the latest data stream is discarded. SESAM is summarized in Algorithm 1, which is represented in FIG. 3, and LISA in Algorithm 2, which is represented in FIG. 4.

1.3 Algorithms—White Transmit Covariance

It has been found that one possibility to reduce the negative effects of uncertainty in the interference is to constrain the transmission strategies such that the interference caused to other cells is constant. For example one could restrain to a single precoder, or necessitate the covariance of the transmitted signal to have a certain structure, for example a scaled identity matrix. This means to remove the power constraint and force a white transmit covariance $$\sum_{k \in \mathcal{K}} Q_k = \frac{P}{N_{tx}} I \quad (1.9)$$

that uses the full power budget $$tr\left\{\sum_{k \in \mathcal{K}} Q_k\right\} = P.$$

This reduces the uncertainty in interference to the uncertainty in the cross-channels. In case the cross-channels are perfectly known, the prediction (1.1) is correct. The weighted sum-rate optimization under a white transmit covariance constraint is:

$$\underset{Q_1, \dots, Q_k}{\text{maximize}} \sum_{k \in \mathcal{K}} w_k r_k(Q_1, \dots, Q_k) \quad (1.10)$$

$$\text{subject to} \sum_{k \in \mathcal{K}} Q_k = \frac{P}{N_{tx}} I$$

$$Q_k \geq 0 \, \forall \, k \in \mathcal{K}.$$

As a remark, it should be noted that the problem is feasible, for example by setting $$Q_k = \frac{P}{N_{tx}} I$$

for any k, this is what is called stabilization in [2]. An algorithm to compute a global optimal solution to the WSR optimization with white transmit covariance constraint can be derived as a special case from the results in [14]. But, the high computational complexity, for DPC and finding a solution, prevent a practical implementation.

A practical approach is the use of unitary precoders, for example Per-User Unitary Rate Control (PU2RC) [15]. Using the stream based formulation, unitary (or orthogonal) precoding, means to select precoders such that V is unitary, that is $VV^H = I$. In case every transmitter serves exactly $N_{tx}$ datastreams and allocates equal power among them, $$p_d = \frac{P}{N_{tx}} \forall d \in D,$$

the transmit covariance is $$\sum_{k \in \mathcal{K}} Q_k = \frac{P}{N_{tx}} \sum_{d \in \mathcal{D}} v_d v_d^H = \frac{P}{N_{tx}} VV^H = \frac{P}{N_{tx}} I. \quad (1.11)$$

In the following, some algorithms using unitary precoding will be described. wherein the algorithms described the following assume linear precoding.

It has been found that unitary precoding is attractive as the intra-cell interference $C_{intra-cell,d}$ of stream d, and therefore the achievable data rate, only depends on the own precoder $v_d$, $$C_{intra-cell,d} = \frac{P}{N_{tx}} H_{s_d} \left( \sum_{d' \in \mathcal{D}d} v_{d'} v_{d'}^H \right) H_{s_d}^H \quad (1.12)$$

$$= \frac{P}{N_{tx}} H_{s_d} \left( \sum_{d' \in \mathcal{D}} v_{d'} v_{d'}^H \right) H_{s_d}^H - \frac{P}{N_{tx}} H_{s_d} v_d v_d^H H_{s_d}^H$$

$$= \frac{P}{N_{tx}} H_{s_d} H_{s_d}^H - \frac{P}{N_{tx}} H_{s_d} v_d v_d^H H_{s_d}^H.$$

In the above, $$\frac{P}{N_{tx}} H_{s_d} H_{s_d}^H$$

may represent an upper limit of intra-cell interference.

For single antenna receivers (remember $h_k = H_k^T$) this is $$c_{intra-cell,d}^2 = \frac{P}{N_{tx}} h_{s_d}^H h_{s_d} - \frac{P}{N_{tx}} h_{s_d}^H v_d v_d^H h_{s_d} \quad (1.13)$$

$$= \frac{P}{N_{tx}} \|h_{s_d}\|_2^2 - \frac{P}{N_{tx}} \|h_{s_d}^H v_d\|^2.$$

This means that for PU2RC with a fixed unitary precoder codebook, every user can decide for the codebook entry $v_d$ that maximizes his data rate, which is given by $$r_d = \log_2\left(1 + \frac{|h_{s_d}^H v_d|^2 \frac{P}{N_{tx}}}{\tilde{c}_{s_d}^2 + \|h_{s_d}\|_2^2 \frac{P}{N_{tx}} - |h_{s_d}^H v_d|^2 \frac{P}{N_{tx}}}\right). \quad (1.14)$$

Advanced downlink strategies with adaptive precoding are also available for unitary precoding. In case the user set S is given, such that $|S|=N_{tx}$, the weighted sum-rate optimization is $$\underset{V}{\text{maximize}} \sum_{d \in \mathcal{D}} w_{s_d} \log_2\left(1 + \frac{|h_{s_d}^H v_d|^2 \frac{P}{N_{tx}}}{\tilde{c}_{s_d}^2 + \|h_{s_d}\|_2^2 \frac{P}{N_{tx}} - |h_{s_d}^H v_d|^2 \frac{P}{N_{tx}}}\right) \quad (1.15)$$

subject to $VV^H = I$, which is unfortunately a non-convex problem. A global optimal algorithm is only known for the two user case [16]. Algorithms to find a local optimal solution can be found in [17, 18]. The user set has to be determined by an additional user selection scheme, which motivates algorithms that find the user set and precoders jointly, see [19, 20] for MISO and [21] for MIMO. These algorithms are all designed for sum-rate maximization, but in all cases an extension to WSR is possible.

In the following, some algorithms will be described in a consistent (and in some cases more sophisticated) notation and to allow for a comparison in the relevant scenarios the extension to weighted sum-rate will be shown. Additionally, in case not already present in the original work, a stopping criteria is included, see (1.8), to interrupt the successive allocation if the new configuration has a lower weighted sum-rate.

In the following, some algorithms will be described which are somewhat similar to the algorithms in reference [19]. In [19] the precoder $v_1$ of the first data stream is chosen in the direction of the users channel $$v_1 = \frac{h_{s_1}}{\|h_{s_1}\|_2}.$$

In this case the first stream has no intra-cell interference, see Equation (1.13). The first user is selected as the one that achieves the maximal weighted rate:

$$s_1 = \underset{k \in \mathcal{K}}{\arg\max}\left\{w_k \log_2\left(1 + \frac{\|h_k\|_2^2 \frac{P}{N_{tx}}}{\tilde{c}_k^2}\right)\right\}$$

In a next step the remaining $N_{tx}-1$ precoders of the unitary precoding matrix V are determined via Gram-Schmidt orthogonalization starting with v1. Finally, the remaining users are successively assigned to the precoders, see Algorithm 3, which is represented in FIG. 5. Improved performance can be obtained by trying every user as the first user, see Algorithm 4, which is represented in FIG. 6.

In the following, an algorithm will be described which is somewhat similar to the algorithm shown in reference [20]. In [20] users and precoders are determined successively, where in every step the weighted sumrate is maximally increased and the precoder is orthogonal to the already determined precoders, see Algorithm 5, which is represented in FIG. 7. Orthogonality of the precoders can be achieved by a successively updated projector matrix II as for the SESAM and LISA algorithm, see Section 1.2.

In the following, an algorithm will be described which is similar to the algorithm described in reference [21]. Multiple receive antennas are considered in [21], where receive and transmit filters are determined jointly. First, for every user an eigenvalue decomposition (EVD) $H_k^H H_k$ is computed and the user with the highest maximal eigenvalue is selected as the first user. Assuming the eigenvalue decomposition returns a full unitary basis $V_k$, it is used as the precoder matrix. In a second step user to precoder allocation is performed successively. Maximum ratio combining (MRC) receive filters are used, for data stream d that is $H_{s_d} v_d$, up to a normalization. Using MRC filters and the unitary property $\Sigma_{i \in D} v_i v_i^H = I$, the rate expression (1.5) becomes $$r_d = \log_2\left(1 + \frac{|v_d^H H_{s_d}^H H_{s_d} v_d|^2 \frac{P}{N_{tx}}}{v_d^H H_{s_d}^H \tilde{C}_{s_d} H_{s_d} v_d + \sum_{i \in \mathcal{D} \setminus d}|v_d^H H_{s_d}^H H_{s_d} v_i|^2 \frac{P}{N_{tx}}}\right)$$

$$= \log_2\left(1 + \frac{|v_d^H H_{s_d}^H H_{s_d} v_d|^2 \frac{P}{N_{tx}}}{v_d^H H_{s_d}^H \tilde{C}_{s_d} H_{s_d} v_d + v_d^H H_{s_d}^H H_{s_d}\left(\sum_{i \in \mathcal{D} \setminus d} v_i v_i^H\right) H_{s_d}^H H_{s_d} v_d \frac{P}{N_{tx}}}\right)$$

$$= \log_2\left(1 + \frac{|v_d^H H_{s_d}^H H_{s_d} v_d|^2 \frac{P}{N_{tx}}}{v_d^H H_{s_d}^H \tilde{C}_{s_d} H_{s_d} v_d + v_d^H H_{s_d}^H H_{s_d} H_{s_d}^H H_{s_d} v_d \frac{P}{N_{tx}} - v_d^H H_{s_d}^H H_{s_d} v_d v_d^H H_{s_d}^H H_{s_d} v_d \frac{P}{N_{tx}}}\right)$$

$$= \log_2\left(1 + \frac{|v_d^H H_{s_d}^H H_{s_d} v_d|^2 \frac{P}{N_{tx}}}{v_d^H H_{s_d}^H \tilde{C}_{s_d} H_{s_d} v_d + \|v_d^H H_{s_d}^H H_{s_d}\|_2^2 \frac{P}{N_{tx}} - |v_d^H H_{s_d}^H H_{s_d} v_d|^2 \frac{P}{N_{tx}}}\right)$$

Please note that $v_d^H H_{s_d}^H \tilde{C}_k H_{s_d} v_d = 1$ in the original work. The method is summarized in Algorithm 6, which is represented in FIG. 8.

1.4 Summary of Alternative Algorithms

In the following, the presented alternative methods are summarized and the relationship to the embodiments according to the invention will be discussed. For an overview see Table 1.1, which is represented in FIG. 9.

In the power constraint case, see Section 1.2, the global optimal transmission strategies are found by the MIMO BC-MAC duality [4, 5] in case DPC is used. There exist various low complexity approaches, such as the SESAM [9, 10] algorithm, that typically build on zero-forcing. The global optimal solution for linear precoding is an open problem for multiple receive antennas, for single antenna receivers solutions can be found by global optimization [6, 7]. An approach for local optimal solutions can be found in [8] and LISA [11, 12, 13] provides a low-complexity algorithm.

For DPC the white transmit covariance constraint an algorithm can be derived as a special case from the results in [14]. The global optimal solution for linear unitary precoding is an open problem for multiple receive antennas, for single antenna receivers a solution is available for the 2 user case [16]. Local optimal solutions for single antenna receivers can be found in [17, 18].

Further, there exist multiple low-complexity algorithms for MISO [19, 20] and the MIMO case is treated in [21].

Embodiments according to the invention create a low-complexity algorithm for unitary linear precoding (Unitary-LISA) that can be applied for multiple receive antennas. For the case of single antenna receivers it is also applicable and provides similar results as the algorithm according to [20].

2. Transmission Filter Calculator According to FIG. 10

Figure 10:
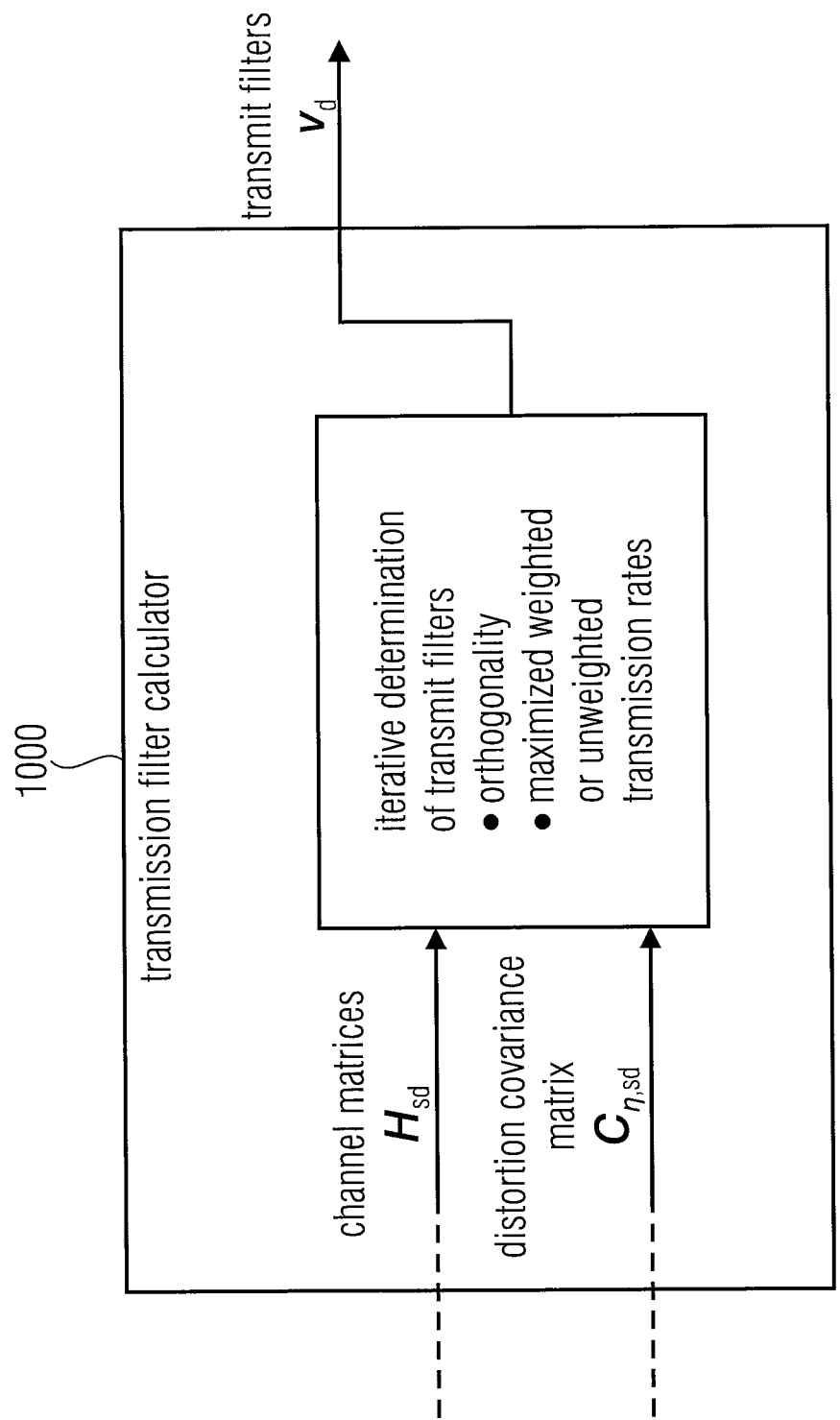
FIG. 10 shows a block schematic diagram of a transmission filter calculator, according to an embodiment of the invention.

FIG. 10 shows a block schematic diagram of a transmission filter calculator according to an embodiment of the invention. The transmission filter calculator 1000 is adapted for calculating at least a transmit filter $v_d$ for a communication from a transmit communication device comprising a plurality of antennas to a receive communication device out of a plurality of receive communication devices comprising a plurality of antennas via a multiple-input-multiple-output channel. The transmission filter calculator 1000 typically receives, or determines itself, channel matrices $H_{s_d}$ describing MIMO channel characteristics between the communication device and a currently considered one of the receive communication devices (indicated by index $s_d$, which is equivalent herein to index sd) and a distortion covariance matrix $C_{n,sd}$ describing a noise, an inter-cell interference and an upper limit of an intra-cell interference (wherein the index sd indicates that the distortion covariance matrix is associated with receive communication device having a receive communication device index sd). However, the transmission filter calculator 1000 may alternatively receive a combined information which combines a channel matrix and a distortion covariance matrix. Moreover, the transmit filter calculator is configured to provide one or more transmit filters (advantageously a plurality of transmit filters), wherein each of the transmit filters is described by a transmit filter vector $v_d$. However, for convenience, the transmit filter vectors are sometimes also designated as transmit filters. The transmission filter calculator is configured to iteratively determine the transmit filters for a plurality of data streams $s_d$. The transmission filter calculator 1000 is configured to choose a transmit filter (or transmit filter vector) $v_d$ in a given iteration, which may be designated by an iteration index d, such that the transmit filter (or transmit filter vector) $v_d$ chosen in the given iteration is orthogonal to one or more transmit filters (or transmit filter vectors) $v_d$ chosen in one or more previous iterations, and such that a weighted or unweighted transmission rate $r_d$ obtainable using the transmit filter (or the transmit filter vector) $v_d$ chosen in the given iteration d is maximized. It should be noted here that the iteration index d may also designate a d-th data stream, which is allocated in the d-th iteration. The transmission filter calculator is configured to choose the transmit filter (or transmit filter vector) $v_d$ in dependence on a matrix product term which is based on a channel matrix $H_{s_d}$ describing MIMO channel characteristics between the transmit communication device and a currently considered one of the receive communication devices and on a distortion covariance matrix describing a noise, an inter-cell interference and an upper limit of an intra-cell interference. In other words, the iterative determination of the transmit filters ensures the orthogonality of transmit filter vectors $v_d$ describing transmit filters and at the same time maximizes a weighted or unweighted transmission rate. The formation of a matrix product term which is based on the channel matrix describing MIMO channel characteristics between the transmit communication device and the currently considered one of the receive communication devices and on a distortion covariance matrix (as defined above) allows for a particularly efficient computation of transmit filter vectors in a low-complexity iterative algorithm.

Additional details regarding the functionality of the transmission filter calculator will be described subsequently, wherein it should be noted that any of the features and functionalities of the method for determining transmit filters may be included in, or performed by, the transmission filter calculator 1000. Moreover, it should be noted that the transmission filter calculator 1000 may be part of a transmitter or transceiver like, for example, a base station in a mobile communication network. It should be noted that the transmission filter calculator may, for example, receive the channel matrices from a channel estimator. Alternatively, however, the channel matrices (or information representing the channel matrices) may be received from communication devices (like, for example, receive communication devices) with which a transmit communication device comprising the transmission filter calculator 1000 desires to communicate. Moreover, the transmission filter calculator may receive the distortion covariance matrix, or an information representing the distortion covariance matrix, from a receive communication device with which the transmit communication device comprising the transmission filter calculator 1000 desires to communication. However, the transmission filter calculator 1000 may alternatively receive a combined information, which may combine the channel matrix information and the distortion covariance matrix information. This combined information (for example, in the form of a product matrix information describing a product matrix, which will be described below) may, for example, be received from a receive communication device with which the transmit communication device comprising the transmission filter calculator 1000 desires to communicate.

Moreover, it should be noted that the transmit filters or transmit filter vectors vd may be used for a transmit beamforming. In other words, the entries of a transmit filter vector may describe intensities (and possibly phases) with which a signal representing a data stream d is transmitted via multiple antennas of the transmit communication device comprising the transmission filter calculator. Accordingly, the transmit filters $v_d$ associated with multiple data streams having data stream indices d describe a "spatial diversity" with which the different data streams are transmitted.

3. Method for Calculating a Transmit Filter According to FIG. 11

Figure 11:
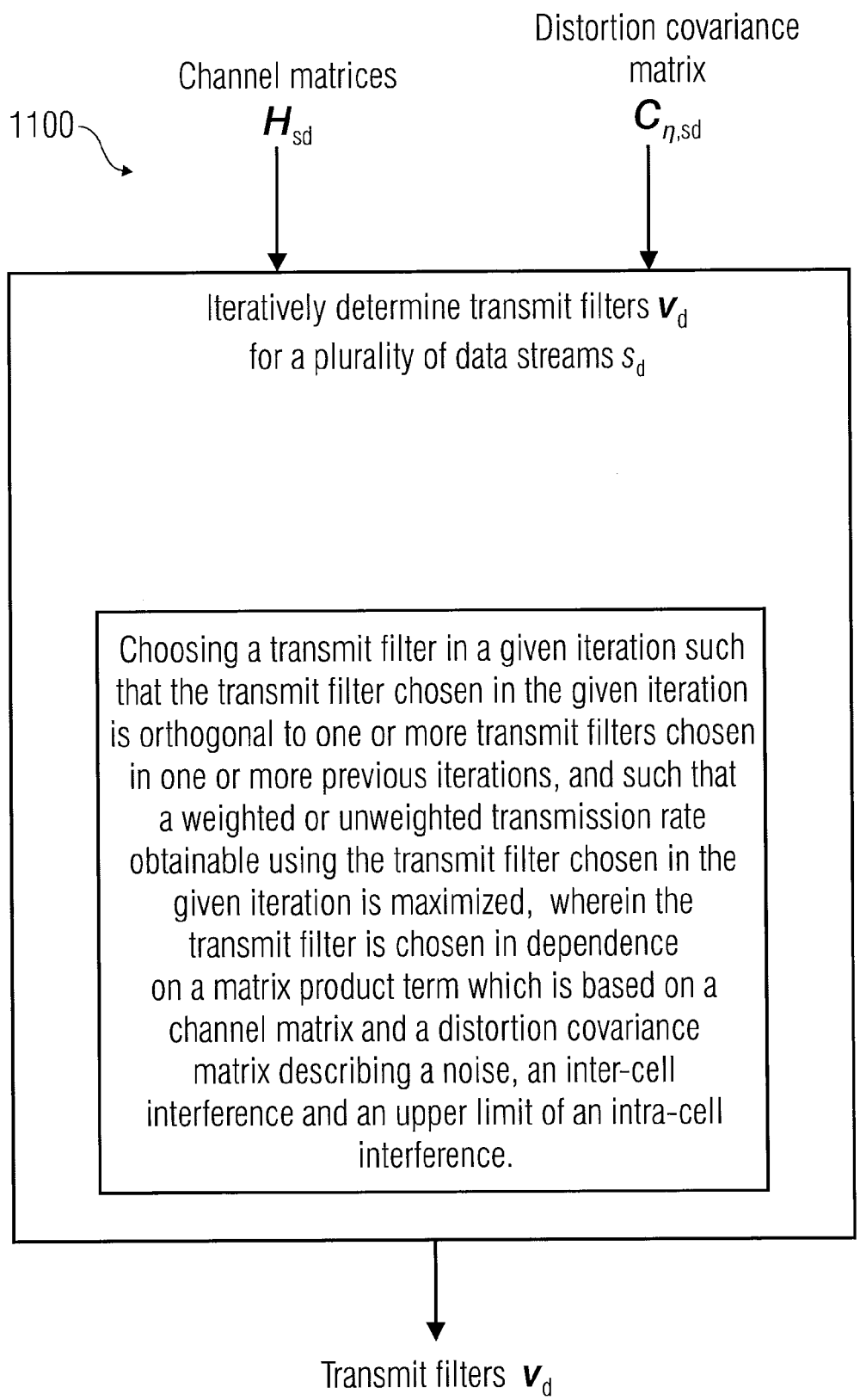
FIG. 11 shows a flowchart of a method for determining transmit filters, according to an embodiment of the invention.

FIG. 11 shows a flowchart of a method for calculating a transmit filter for a communication from a transmit communication device comprising a plurality of antennas to a receive communication device out of a plurality of receive communication devices comprising a plurality of antennas via a multiple-input-multiple-output channel, according to an embodiment of the invention. The method according to FIG. 11 is designated in its entirety with 1100.

The method 1100 receives channel matrices $H_{s_d}$ and distortion covariance matrices $C_{n,sd}$, or a combination thereof (for example in the form of a matrix product term or a product matrix). Moreover, the method 1100 provides, as output values, transmit filter vectors $v_d$ representing transmit filters (or any equivalent representation of said transmit filters).

The method comprises iteratively determining the transmit filter for a plurality of data streams, wherein a transmit filter is chosen in a given iteration such that the transmit filter chosen in the given iteration is orthogonal to one or more transmit filters chosen in one or more previous iterations (or orthogonal to all transmit filters chosen in the one or more previous iterations), and such that a weighted or unweighted transmission rate obtainable using the transmit filter chosen in the given iteration is maximized (or, at least approximately maximized).

When iteratively determining the transmit filters, the transmit filter is chosen in dependence on a matrix product term which is based on a channel matrix $H_{s_d}$ describing MIMO channel characteristics between the transmit communication device and a currently considered one of the receive communication devices and of a distortion covariance matrix $C_{n,sd}$ describing a noise, an inter-cell interference and an upper limit of an intra-cell interference. It should be noted here that the index $s_d$ (sometimes also written in the simplified form sd) designates a currently considered one of the receive devices. Moreover, said index $s_d$ also designates, depending on the circumstances, a selected one of the receive communication devices, selected to receive the data stream having data stream index d. In other words, there is also an association between a data stream having data stream index d and a receive communication device having receive communication device index $s_d$.

Further details regarding the method represented in FIG. 11 will be described subsequently taking reference to FIGS. 12A, 12B, 13A, 13B and 14.

4. Method for Calculating a Transmit Filter According to FIGS. 12A and 12B

Figure 12A:
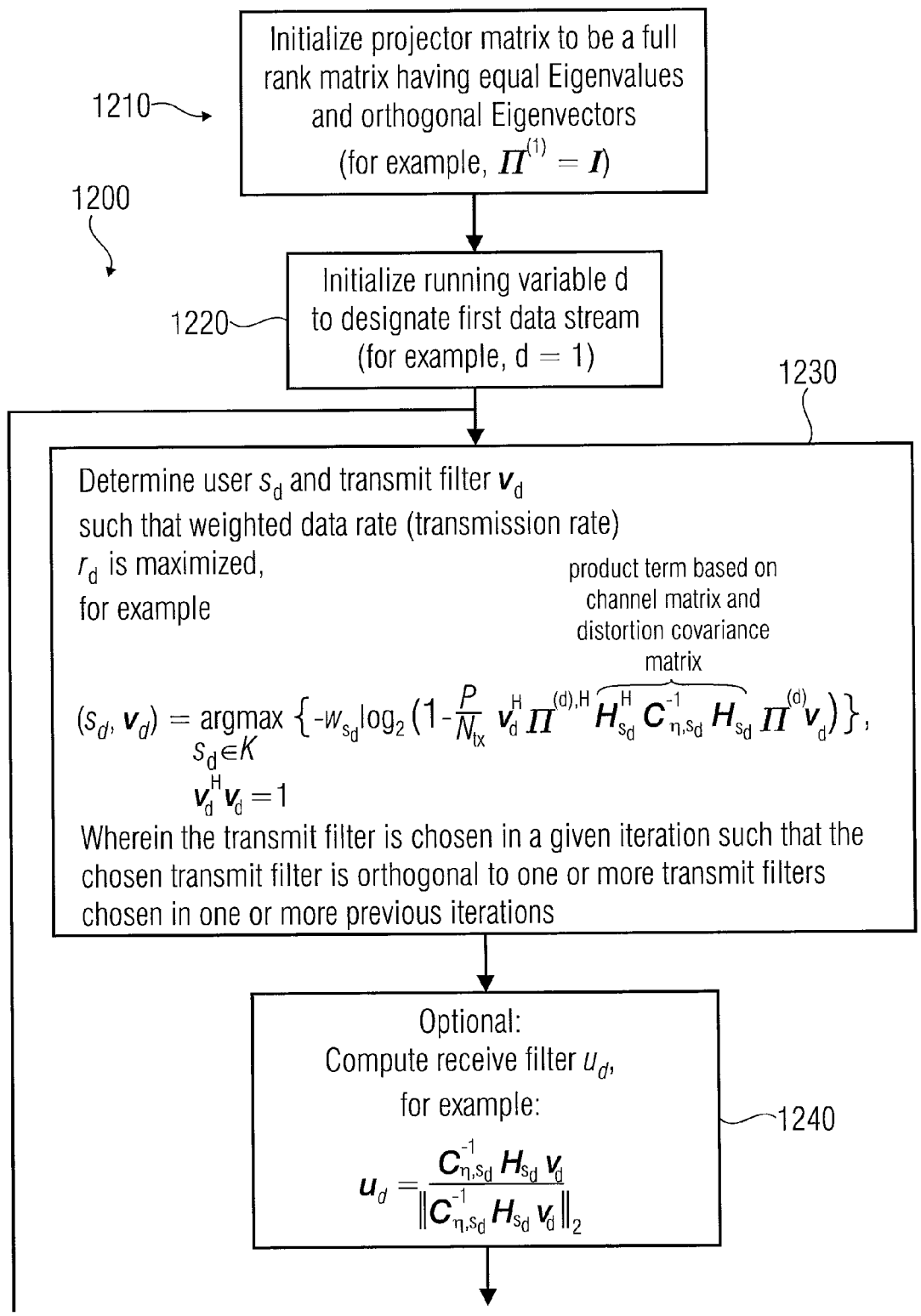
FIGS. 12A and 12B show a detailed flowchart of a method for determining transmit filters, according to an embodiment of the invention.
Figure 12B:
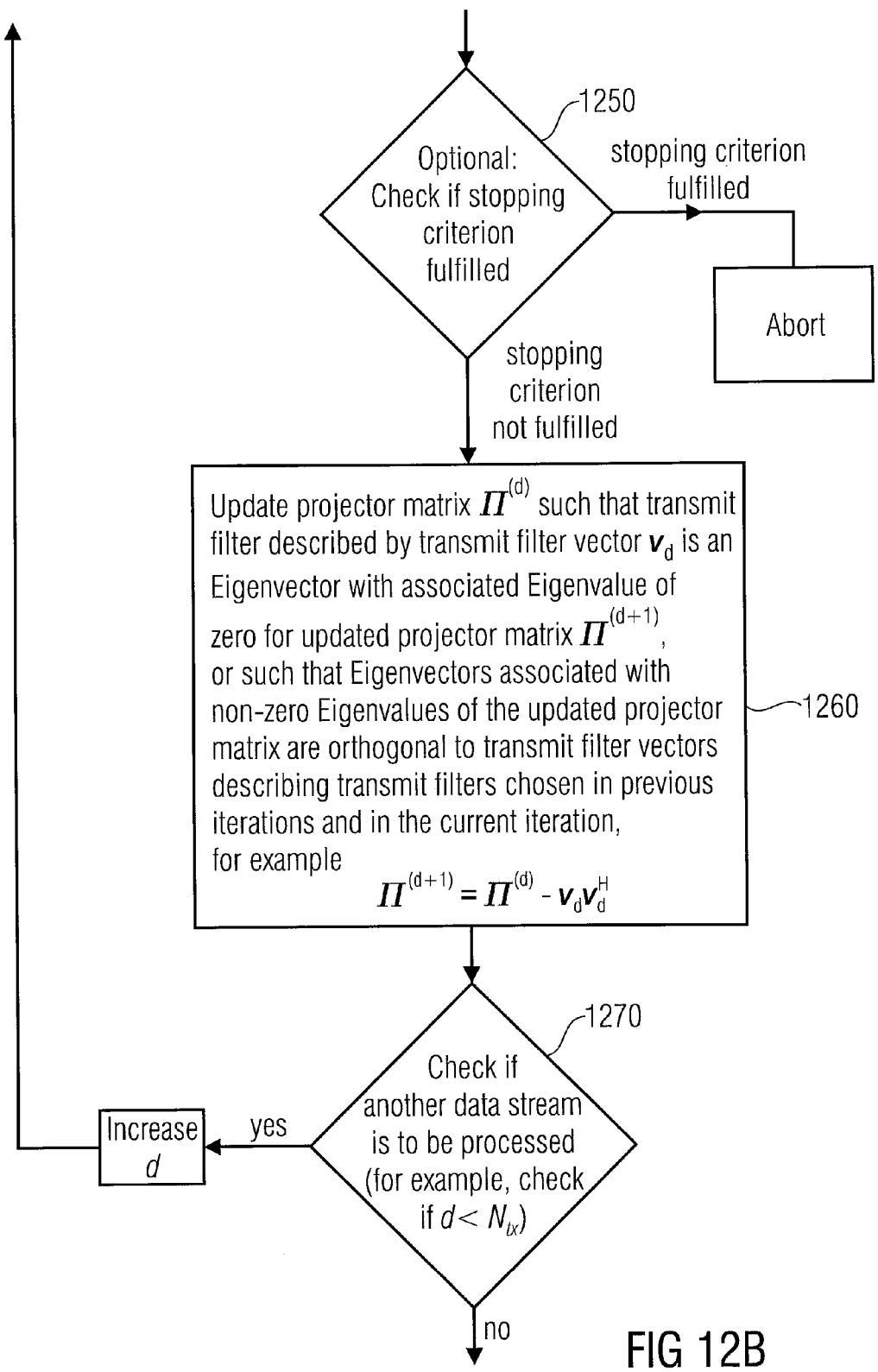

FIGS. 12A and 12B show a detailed flowchart of a method for calculating at least a transmit filter according to an embodiment of the invention.

It should be noted that the method 1200, which is represented in FIGS. 12A and 12B, may be equivalent to the method 1100 represented in FIG. 11. Moreover, the method 1200 according to FIGS. 12A and 12B may be equivalent to the method 1400 according to FIG. 14, which will be described below.

The method 1200 comprises a step 1210 of initializing a projector matrix to be a full rank matrix having equal Eigenvalues and orthogonal Eigenvectors. Accordingly, the projector matrix $\Pi^{(1)}$ of the first iteration (indicated by "$^{(1)}$") may be initialized to be the identity matrix I or a multiple thereof.

In a step 1220, a running variable d may be initialized to designate first data stream and at the same time to designate a first iteration (wherein it is should be noted that a d-th data stream is typically allocated in a d-th iteration). For example, the running variable d may be set to take the value of 1.

In a step 1230, a user (or receive communication device) $s_d$ and the transmit filter or transmit filter vector $v_d$ are determined such that a weighted data rate (also designated as transmission rate) $r_d$ obtained in the d-th iteration is maximized. Here, the condition is observed that the transmit filter is chosen in a given iteration such that the chosen transmit filter is orthogonal to one or more (and advantageously all) transmit filter chosen in one or more previous iterations. Furthermore, it is ensured that the norm of the transmit filter vector describing the transmit filter takes a predetermined value, for example, 1 (which may be worded as the condition $v_d^H v_d = 1$).

For example, an optimization (or maximum search) as indicated in block 1230 of FIG. 12A may be performed in order to determine the user $s_d$ and the transmit filter $v_d$. Regarding this optimization (or maximum search), it is an important aspect that a product term based on the channel matrix describing MIMO channel characteristics between the transmit communication device and a currently considered one of the receive communication devices and on a distortion covariance matrix describing a noise, an inter-cell interference and an upper limit of an intra-cell interference is reevaluated, because it has been found that such a product term allows for a reliable selection of a user and for a reliable determination of a transmit filter $v_d$ with little computational effort.

Figure 13A:
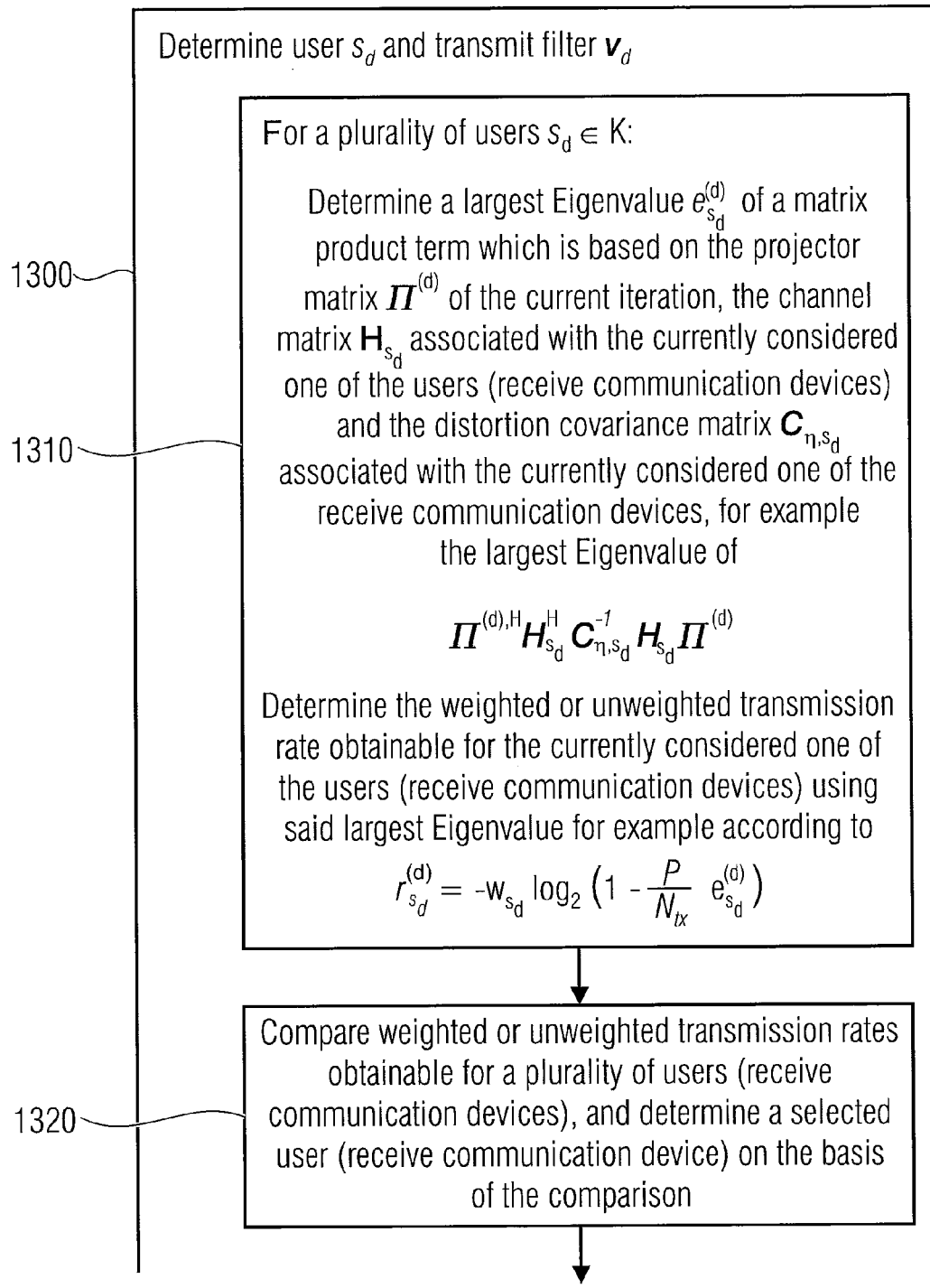
FIGS. 13A and 13B shows a flowchart of a method for determining a user $s_d$ and a transmit filter $v_d$, which can be applied in the algorithm according to FIGS. 12A and 12B.
Figure 13B:
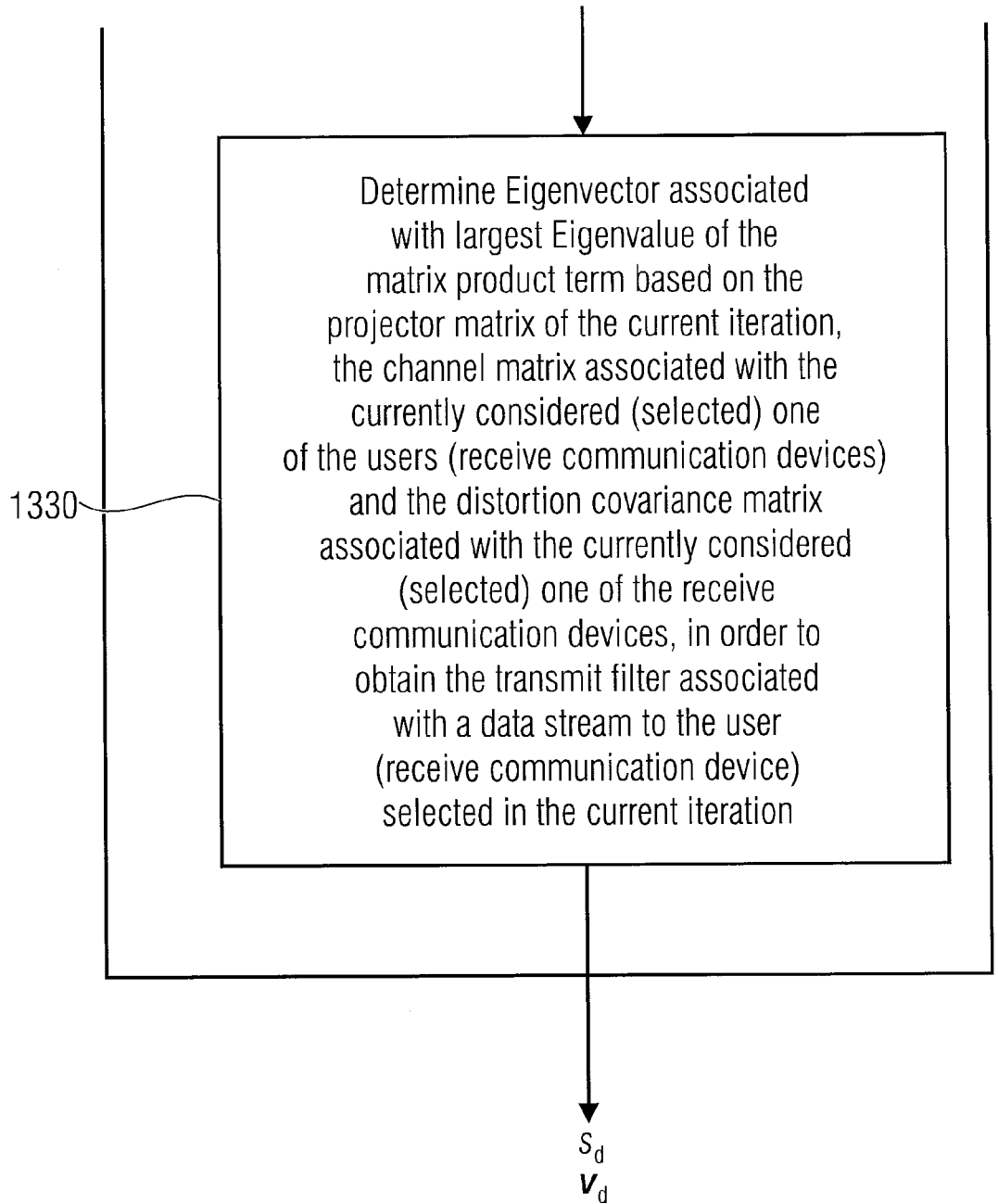
Figure 15:
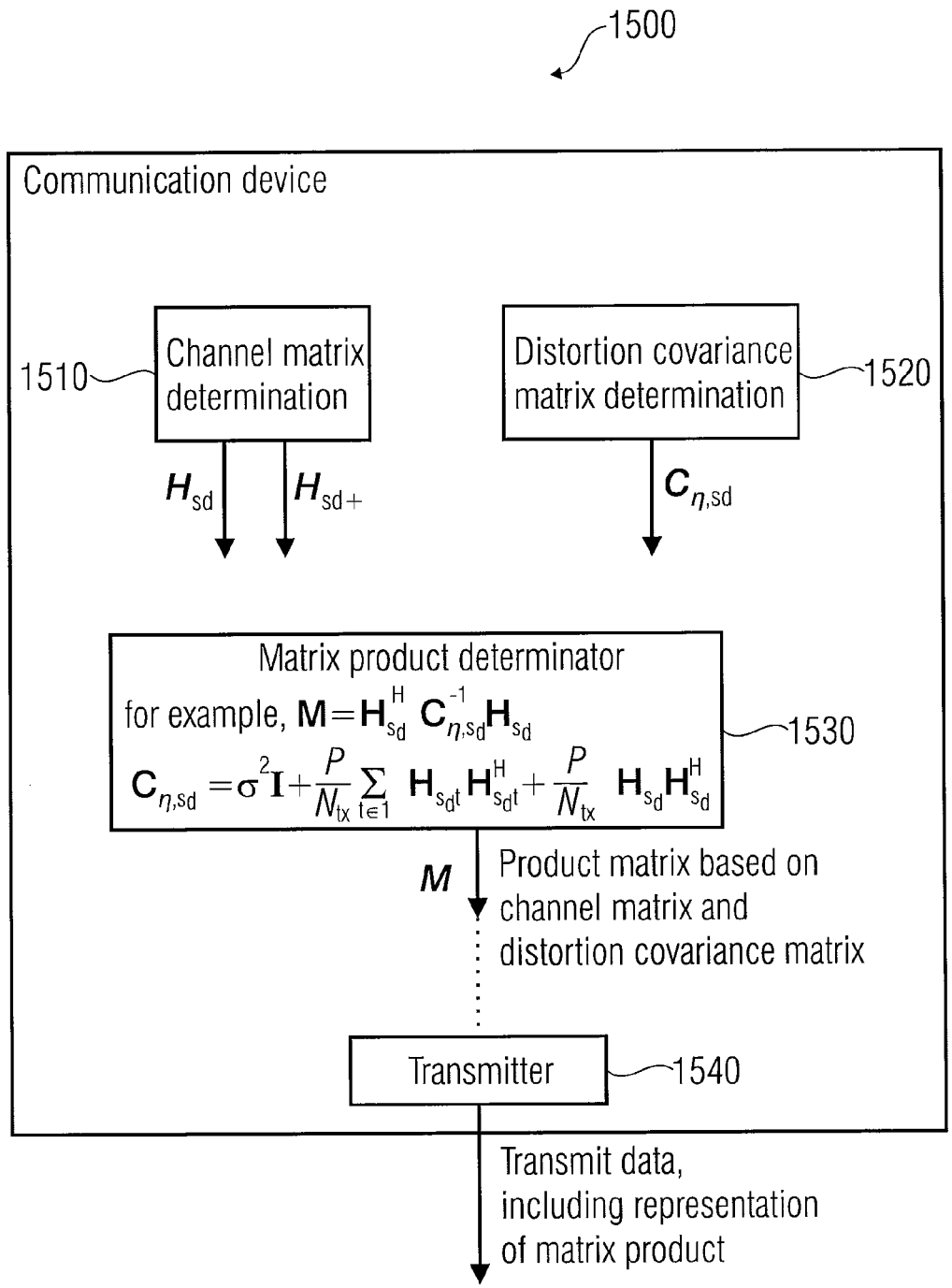
FIG. 15 shows a block schematic diagram of a communication device according to an embodiment of the invention.

Further details regarding a possible determination of the user sd and the transmit filter vd will be described below taking reference to FIGS. 13a and 13b.

The method 1200 optionally comprises a step 1240 of computing a receive filter $u_d$, which may be applied, for example, in the receive communication device $s_d$. The receive filter $u_d$ may, for example, define how the signals from a plurality of antennas of a receive communication device are combined to obtain a signal for the extraction of the data of the data stream having data stream index d, which is directed to the receive communication device (or user) having receive communication device index (or user index) $s_d$. For example, the equation shown in block 1240 of FIG. 12A may be used to compute the receive filter $u_d$ to be used by receive communication device (or user) $s_d$ for receiving data stream d.

Subsequently, an optional check 1250 may be performed whether a stopping criterion is fulfilled or not. For example, if the stopping criterion is fulfilled, the further execution of the algorithm may be avoided. Otherwise, the algorithm may proceed with a step 1260 of updating the projector matrix. However, it should be noted that the check 1250 is not necessitated.

In step 1260, the projector matrix $\Pi^{(d)}$ is updated such that a transmit filter described by a transmit filter vector $v_d$ is an Eigenvector with associated Eigenvalue of 0 for the updated projector matrix $\Pi^{(d+1)}$, or such that Eigenvectors associated with non-zero Eigenvalues of the updated projector matrix are orthogonal to transmit filter vectors describing transmit filters chosen in previous iterations and in the current iteration. For example, the projector matrix $\Pi^{(d+1)}$ for the next iteration may be derived from the projector matrix $\Pi^{(d)}$ for the current iteration according to the equation shown in block 1260 of the method 1200.

Moreover, the algorithm 1260 also comprises checking, in a step 1270, whether another data stream is to be processed. For example, it may be checked whether the iteration index or data stream index d is smaller than the number $N_{tx}$ of transmit antennas of the transmit communication device in which the method 1200 is performed. If the checking 1270 indicates that another data stream is to be processed, the data stream index or iteration index d may be incremented in a step 1280 and the algorithm may proceed with step 1230. Otherwise, if it is found that there is no further data stream to be processed, the algorithm may terminate.

Moreover, it should be noted that the order of the steps may be changed to some degree. For example, the check 1270 may be performed before or after the update 1260 of the projector matrix, such that the update of the projector matrix is only performed if another data stream is to be processed. Similarly, the order of the steps 1240 and 1260 may be changed.

5. Algorithm for Determining User $s_d$ and Transmit Filter $v_d$ According to FIGS. 13a and 13b In the following, a possible algorithm for determining the user $s_d$ and the transmit filter $v_d$ will be described taking reference to FIGS. 13a and 13b, wherein said figures show a flowchart of an algorithm 1300.

The algorithm 1300 may take the place of the step 1230 of the algorithm 1200 and may constitute a particularly computationally efficient way of determining the user $s_d$ and the transmit filter $v_d$.

The algorithm 1300 comprises a step 1310, which is executed for a plurality of users $s_d$ (or, equivalently, for a plurality of receive communication devices $s_d$) out of a set of users (or receive communication devices). In the step 1310 a largest Eigenvalue $e_{s_d}^{(d)}$ of a matrix product term, which is based on the projector matrix $\Pi^{(d)}$ of the current iteration, on the channel matrix $H_{s_d}$ associated with the currently considered one of the users (or receive communication devices) and on the distortion covariance matrix $C_{\eta,sd}$ associated with the currently considered one the receive communication devices, is determined. Subsequently, the weighted or unweighted transmission rate obtainable for the currently considered one of the users (or receive communication devices) is determined using said largest Eigenvalue. Thus, the idea is exploited that such a largest Eigenvalue allows for a computation of a weighted or unweighted transmission rate with little computational effort. For example, the largest Eigenvalue of the matrix product term shown in the block 1310 may be determined and used for obtaining the weighted or unweighted transmission rate $r_{sd}^{(d)}$ for the receive communication device $s_d$ in the iteration d according to the equation shown in block 1310. Thus, weighted or unweighted transmission rates obtainable for a plurality of users in the iteration d may be determined by executing block 1310 multiple times (i.e. for a plurality of users or receive communication devices).

Subsequently, in step 1320, the weighted or unweighted transmission rates $r_{sd}^{(d)}$ obtainable for a plurality of users (or receive communication devices) may be compared, and a selected user (or selected receive communication device) may be chosen on the basis of said comparison. In other words, multiple weighted or unweighted transmission rates obtainable for a plurality of users (or receive communication devices) are compared and the user (or receive communication device) which brings along the largest weighted or unweighted obtainable transmission rate is selected. Accordingly, there is a very simple and computationally efficient mechanism for said selection of a user wherein well-known algorithms for the determination of Eigenvalues can be exploited to improve computational efficiency.

Subsequent to the selection of a user (or a receive communication device) in step 1320, an Eigenvector associated with the largest Eigenvalue of the matrix product term based on the projector matrix of the current iteration, the channel matrix associated with the currently considered (selected) one of the users (or receive communication devices) and the distortion covariance matrix associated with the currently considered (selected) one of the users (or receive communication devices) is determined in step 1330, in order to obtain the transmit filter associated with a data stream to the user (receive communication device) selected in the current iteration. In other words, the Eigenvector associated with said matrix product term may be used, for example, in a normalized form, as the transmit filter vector describing the transmit filter. Thus, the determination of an Eigenvector, which can be implemented using one of many highly efficient algorithms known in the art, may be used in order to determine a transmit filter vector which describes a high precision transmit filter.

To conclude, the algorithm (or method) 1300 provides for a computationally very efficient way of determining a user $s_d$ and transmit filter $v_d$. Moreover, it should be noted that additional implementation details will subsequently be described taking reference to FIG. 14.

6. "Unitary-LISA" Algorithm According to FIG. 14

In the following, some details regarding the so-called "Unitary-LISA" algorithm according to an embodiment of the invention will be described.

Said algorithm termed "Unitary-LISA" is a significant improvement of the "LISA"-algorithm described above, and is a low-complexity algorithm. To facilitate the understanding, in a first step a rate expression for unitary precoding will be derived which generalizes (or improves) an expression for single antenna receivers (1.14) to the multiple receive antenna case. It has been found that this improved rate expression allows to design a successive stream allocation: the so-called "Unitary-LISA" algorithm.

Even though said Unitary-LISA algorithm is also applicable for the special case of single antenna receivers, the unitary-LISA algorithm brings along specific advantages when used in combination with multiple antenna receivers (i.e. receive communication devices).

Contrary to the concept described, for example, in reference [21], a correct prediction of the noise plus interference covariance (which is achieved by the noise covariance matrix $C_\eta$) allows to find the rate maximizing (MMSE) receive filters. Also, it is important to note that the new algorithm according to the embodiments of the invention does not need additional feedback of cross channels or an interference prediction. The embodiments according to the invention thus provide the following contributions:

"Unitary-LISA", a low-complexity solution for linear unitary precoding;
A method to find optimal receive filters; and
A method for the associated channel feedback.

In the following, it will be briefly described how the distortion covariance matrix $C_{\eta,sd}$ is obtained.

Depending on the antenna configuration unitary precoding and a zero-forcing solution contradict. This means, for unitary precoding one has to accept intra-cell interference, which however is known at the time the transmit beamformer for a datastream is selected. By using (1.1), the total predicted noise plus interference (inter-cell and intra-cell) covariance for a stream d assigned to user $s_d$ is $$C_{noise+interference,d} = \underbrace{\sigma^2 I + \frac{P}{N_{tx}}\sum_{t \in I} H_{s_d} H_{s_d t}^H + \frac{P}{N_{tx}} H_{s_d} H_{s_d}^H}_{\tilde{C}_{s_d}} -$$

$$H_{s_d} v_d \frac{P}{N_{tx}} v_d^H H_{s_d}^H$$

$$= \underbrace{\tilde{C}_{s_d} + \frac{P}{N_{tx}} H_{s_d} H_{s_d}^H}_{C_{\eta,s_d}} - H_{s_d} v_d \frac{P}{N_{tx}} v_d^H H_{s_d}^H$$

$$= C_{\eta,s_d} - H_{s_d} v_d \frac{P}{N_{tx}} v_d^H H_{s_d}^H$$

Regarding the above definition of $C_{\eta,sd}$, it should be noted that the distortion covariance matrix $C_{\eta,sd}$ is associated with a receive communication device (or user) having index $s_d$, and is typically independent from the iteration. Moreover, it should be noted that σ designates a noise (including random noise and noise introduced by components of the receiver). Moreover, it should be noted that $H_{s_d t}$ designates channel matrices describing MIMO channel characteristics between the communication device $s_d$ and one or more interference communication devices (for example, transmit communication devices other than the transmit communication device for which the transmit filter is currently determined, for example, transmit communication devices of neighboring communication cells). Also, it should be noted that $H_{s_d}$ designates the channel matrix describing MIMO channel characteristics between the receive communication device $s_d$ and the transmit communication device for which the transmit filter is currently determined. Also, it should be noted that the term $$\frac{P}{N_{tx}} H_{s_d} H_{s_d}^H$$

describes an upper limit of an intra-cell interference, i.e. an interference caused by the transmission of the transmit communication device for which the transmit filter is currently determined. Thus, it can be seen that the total noise plus interference $C_{noise+interference,d}$ is somewhat smaller than the noise plus interference described by the distortion covariance matrix $C_{\eta,sd}$.

However, as will be described in the following, the usage of the distortion covariance matrix $C_{\eta,sd}$ results in a very efficient algorithm which brings along good results.

Therefore by starting from (1.3) and assuming a rank one covariance given by $$v_d \frac{P}{N_{tx}} v_d^H$$

we obtain for the rate:

$$\begin{aligned}
r_d &= \log_2 \det\left(I + \left(C_{\eta,s_d} - H_{s_d} v_d \frac{P}{N_{tx}} v_d^H H_{s_d}^H\right)^{-1} H_{s_d} v_d \frac{P}{N_{tx}} v_d^H H_{s_d}^H\right) \quad (1.16)\\
&= \log_2\left(1 + \frac{P}{N_{tx}} v_d^H H_{s_d}^H \left(C_{\eta,s_d} - H_{s_d} v_d \frac{P}{N_{tx}} v_d^H H_{s_d}^H\right)^{-1} H_{s_d} v_d\right)\\
&= \log_2\left(1 + \frac{P}{N_{tx}} v_d^H H_{s_d}^H \left(C_{\eta,s_d}^{-1} + \underbrace{\dfrac{C_{\eta,s_d}^{-1} H_{s_d} v_d \frac{P}{N_{tx}} v_d^H H_{s_d}^H C_{\eta,s_d}^{-1}}{1 - \frac{P}{N_{tx}} v_d^H H_{s_d}^H C_{\eta,s_d}^{-1} H_{s_d} v_d}}_{=c}\right) H_{s_d} v_d\right)\\
&= \log_2\left(1 + c + \frac{c^2}{1-c}\right)\\
&= \log_2\left(\frac{(1-c) + c(1-c) + c^2}{1-c}\right)\\
&= -\log_2(1-c)\\
&= \log_2\left(1 - \frac{P}{N_{tx}} v_d^H H_{s_d}^H C_{\eta,s_d}^{-1} H_{s_d} v_d\right)
\end{aligned}$$

Note that, $$1 - \frac{P}{N_{tx}} v_d^H H_{s_d}^H C_{\eta,s_d}^{-1} H_{s_d} v_d$$

is the MSE (mean squared error) and this result can also be derived by using the MMSE receiver [22]. Up to a normalizing factor, the MMSE (minimum mean squared error) filter is given by $C_{\eta,s_d}^{-1} H_{s_d} v_d$.

The optimal precoder $v_d$ for data stream d is therefore the normalized eigenvector of $H_{s_d}^H C_{\eta,s_d}^{-1} H_{s_d}$ that corresponds to the largest eigenvalue. As intra and inter-cell interference are assumed to be known, optimal receive filters can be computed. It has been found that we can use (1.16) as the rate estimation (it is now correct) in LISA without zero forcing and power allocation step. The Unitary-LISA method is summarized in Algorithm 7, which is represented in FIG. 14.

In the following, the "Unitary-LISA" algorithm will be briefly discussed taking reference to FIG. 14, which shows a graphical representation of said algorithm, which may be performed by the transmission filter calculator discussed above, and the functionalities of which may be included into the above described method for calculating a transmit filter.

The algorithm 1400 according to FIG. 14 comprises an initialization of a projector matrix Π, which is shown at reference numeral 1410. Moreover, the algorithm 1400 comprises a loop 1420 which is repeated for values of the running variable d from 1 to $N_{tx}$, wherein running variable d designates a data stream and an index of an iteration. In the loop 1420, a receive communication device (or user) having index $s_d$ and a corresponding transmit filter described by a transmit filter vector $v_d$ is selected, as shown at reference numeral 1430. In the selection 1430, a pair of a receive communication device index $s_d$ and a transmit filter vector $v_d$ is chosen, such that an expression shown at reference numeral 1432 is maximized. In said expression, $w_{sd}$ is a weighting index which describes a weighting of a data stream transmitted to the user device having user device index (or receive communication device index $s_d$). In other words, $w_{sd}$ describes how important it is to transmit data to the receive communication device $s_d$ (wherein $w_{sd}$ may change between iterations, for example in response to an allocation of a data stream in a previous iteration). In the selection 1430, it is assumed that the transmit filter vector $v_d$ is normalized. A possible algorithm for the selection 1430 has been discussed taking reference to FIGS. 13a and 13b. Moreover, it should be noted that the complexity of the selection 1430 is relatively small since it is only necessitated to compare maximal obtainable rates for the receive communication devices which are in communication with the transmit communication device.

The loop 1420 also comprises a selection 1440 of a receive filter described by a receive filter vector $u_d$.

Moreover, the loop 1420 optionally comprises the evaluation of a stopping criterion, which is shown in reference numeral 1450. For example, the loop may be aborted if sufficient data rate could be allocated. Also, the loop may be aborted if it is found that the allocation of additional links (data streams) does no longer significantly improve the data rate.

Moreover, the projector is updated for the next loop iteration, as shown at reference numeral 1460.

It should be noted that step 1410 corresponds to step 1210, that the loop 1420 corresponds to steps 1220 and 1270, that step 1430 corresponds to step 1230, that step 1440 corresponds to step 1240, that step 1450 corresponds to step 1250 and that step 1460 corresponds to step 1260.

Moreover, it should be noted that the algorithm may also be applied in the special case of single antenna receivers, which may also be considered as a multiple-input-single-output case or MISO case. For the special case of single antenna receivers, the rate expression (1.16) can be shown to be equivalent to equation (1.14). For MISO, an arbitrary scalar receive filter can be selected. Accordingly, algorithm 7 remains applicable with some simplifications for the special case of single antenna receivers.

In the following, the main advantages of the algorithm 1400 according to an embodiment of the invention will be summarized:

multiple data streams per user

The multiple receive antennas allow multiple independent data streams for each user, which is supported in the Unitary-LISA algorithm but not in [21]. Note that these streams are in general not orthogonal.

receive filters and link rate adaptation

Note that the optimal receive filter for a data stream can be found by providing information on the used precoder to the user, which is also necessitated for [21]. For non-unitary approaches such as LISA to compute the optimal receive filters, also knowledge on the transmit covariances of the neighbouring transmitters is necessitated, which usually is obtained by additional reference signals, that are also necessitated for improved link rate adaption. Details are provided with the description of the reference algorithms in Section 7.

As both intra and inter-cell interference are considered correctly when selecting the next data stream, the assumed SINR is also correct and is known without additional feedback of the users. Therefore the link rate can be optimally adapted.

channel feedback

Note that $C_{\eta,k}^{-1}$ can be computed at the receiver, so the user can calculate an efficient channel $C_{\eta,k}^{-0.5} H_k$ and provide (quantized) feedback to the transmitter. This means, the Unitary-LISA algorithm does not need feedback of cross-channels or ICI measurements, which makes the algorithm especially attractive for deployable networks and inoperable with existing signaling and feedback methods.

7. Simulation Results

Figure 17:
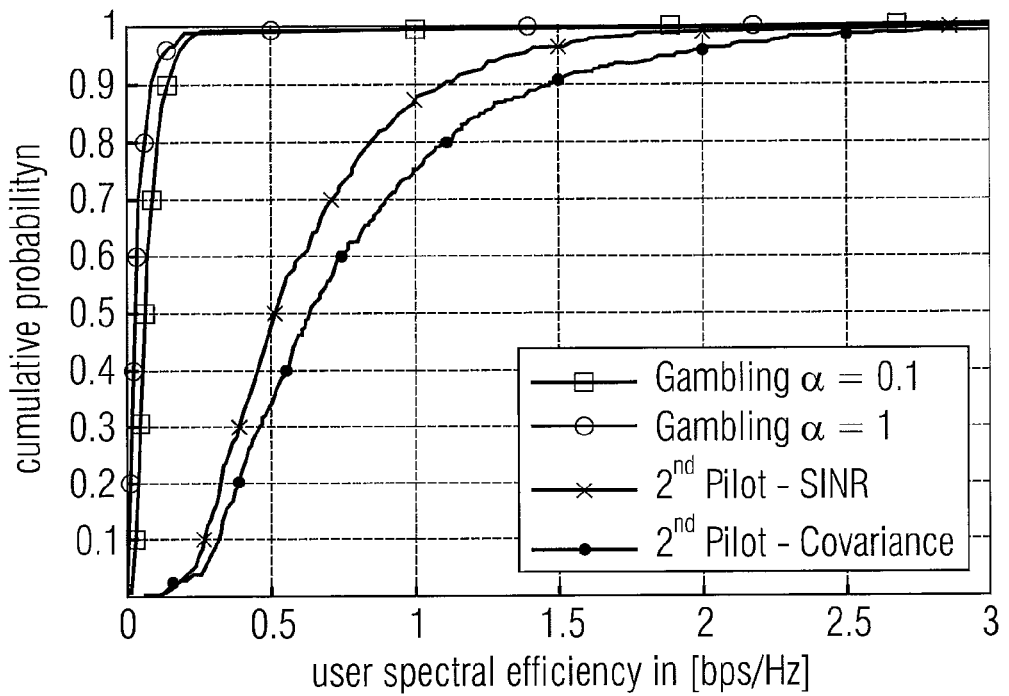
FIG. 17 shows a graphic representation of an effect of a known interference in the LISA algorithm.
Figure 18:
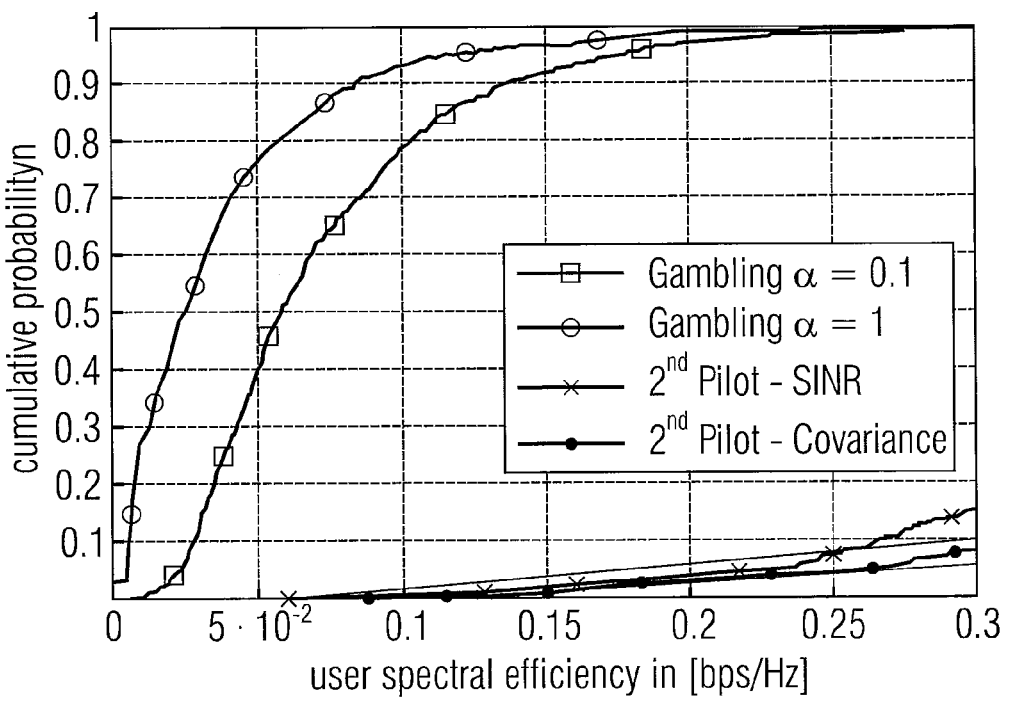
FIG. 18 shows a zoomed graphic representation of an effect of unknown interference in the LISA algorithm.

In the following, some simulation results will be discussed taking reference to FIGS. 17, 18 and 19.

Although the restriction to a white transmit covariance means a performance loss for an isolated cell, we do expect a significant gain for interference networks. We compare the Unitary-LISA algorithm to the existing LISA algorithm in a interference network. Both are applied in a scenario with time variant channels and fractional reuse, as in [23], but without dynamic cell selection. This means we have more users that are affected by interference, which should be in favor of our method. For the LISA algorithm we use a prediction of the inter-cell interference according to (1.1). As the interference is not as expected, link rate adaption needs additional processing [2]. The first idea is to multiply the expected rates by a constant factor α that is between zero and one to avoid outages. This approach is called gambling in and by experiments we found that the best performing factor is α=0.1. Alternatively, additional reference signals (2nd pilots) can be used to either estimate the correct SINR, which allows for optimal link rate adaption, or to estimate the real inter-cell interference which would allow to find the optimal receive filters, but this necessitates even more overhead by longer training sequences. FIG. 17 shows how drastic the effect of unknown interference can be and that the gambling approach is by far not competitive. If we zoom into the plot, FIG. 18, we can see that for α=1, roughly 4% of the users are completely excluded from network service. Remember this is a CDF of the average data rate.

The local optimal approaches in [17, 18] are easily extended to multiple receive antennas, by considering the rate formulation (1.16). But these local optimal approaches can only be used if the user set is given. Running the algorithm for all possible user selections is not practical, we therefore add a simple user selection by deciding for the user set that promises the highest sumrate. In general one would expect the best performance from this optimization based approach, but the non-optimal users selection seams to have a drastic impact. The work in [21] seams to be an (weak and somewhat inaccurate) attempt to generalize the result in [19] to multiple receive antennas. Instead, we correctly extend the work in [19] to the multiple receive antenna case. The work in [20] is for single receive antennas and for this scenario the Unitary-LISA is identical. An accurate generalization to multiple-receive antennas results in Unitary-LISA. Further, we include PU2RC [15] and assume the codebook as in LTE, but only consider multi-user transmission. One has to consider, that PU2RC works with very low channel feedback overhead, while all other attempts assume full CSI at the transmitter. For Unitary-LISA, the inter-cell interference is known and both the optimal link rate and the optimal receive filter can be computed. FIG. 19 shows the CDF of the average user data rates. We can see that the Unitary-LISA algorithm outperforms existing approaches.

8. Communication Device

In the following, a communication device (for example, a receive communication device) 1500 will be described, which is particularly well-suited to usage in combination with the transmission filter calculation discussed above.

The communication device 1500 is adapted for communicating with a transmit communication device in the presence of one or more interferer communication devices. The communication device 1500 is configured to determine a channel matrix $H_{s_d}$ describing MIMO channel characteristics between the communication device 1500 (having communication device index $s_d$) and the transmit communication device. Moreover, the communication device is also configured to determine one or more channel matrices $H_{s_d,t}$ describing MIMO channel characteristics between the communication device and the one or more interferer communication devices, wherein the interferer communication devices have interferer communication device indices t. The interferer communication devices t may, for example, be base stations of adjacent communication cells, while the term "transmit communication device" may designate the base station of the current communication cell in which the communication device 1500 is located.

The communication 1500 is also configured to determine a matrix product which is based on the channel matrix $H_{s_d}$ describing a MIMO channel between the communication device and the transmit communication device (for example, the base station of the current communication cell) and on a distortion covariance matrix $C_\eta$ describing a noise, an inter-cell interference and an upper limit of an intra-cell interference, to obtain a product matrix. Moreover, the communication device 1500 is configured to transmit the product matrix (rather than the individual matrices $H_{s_d}$, $C_\eta$) to the transmit communication device.

In other words, communication device 1500 may, for example, comprise a channel matrix determination 1510 and a distortion covariance determination 1520. Also, the communication device 1500 may comprise a matrix product determinator 1530, which is configured to determine said matrix product on the basis of the matrix $H_{s_d}$ and the matrix $C_\eta$. The product matrix M, which is formed by the matrix product determinator 1530 is then transmitted, for example using a transmitter 1540, to the transmit communication device. In other words, a representation of the product matrix provided by matrix product determinator 1530 may be included into transmit data, which are transmitted, using the transmitter 1540, from the communication device 1500 to the transmit communication device (not shown). By transmitting the product matrix, it can be avoided to transmit the individual matrices $H_{s_d}$, $C_{n,sd}$.

For example, the matrix product determinator 1530 may be configured to compute the product matrix M as shown in block 1530 of the communication device 1500.

Naturally, the communication device 1500 may comprise additional functionality to transfer data, encoded audio or video signals, or the like. Also, the communication device 1500 is typically configured to receive data from a transmit communication device (for example, from a transmit communication device comprising the transmission filter calculator discussed above).

9. Method for Operating a Communication Device

Figure 16:
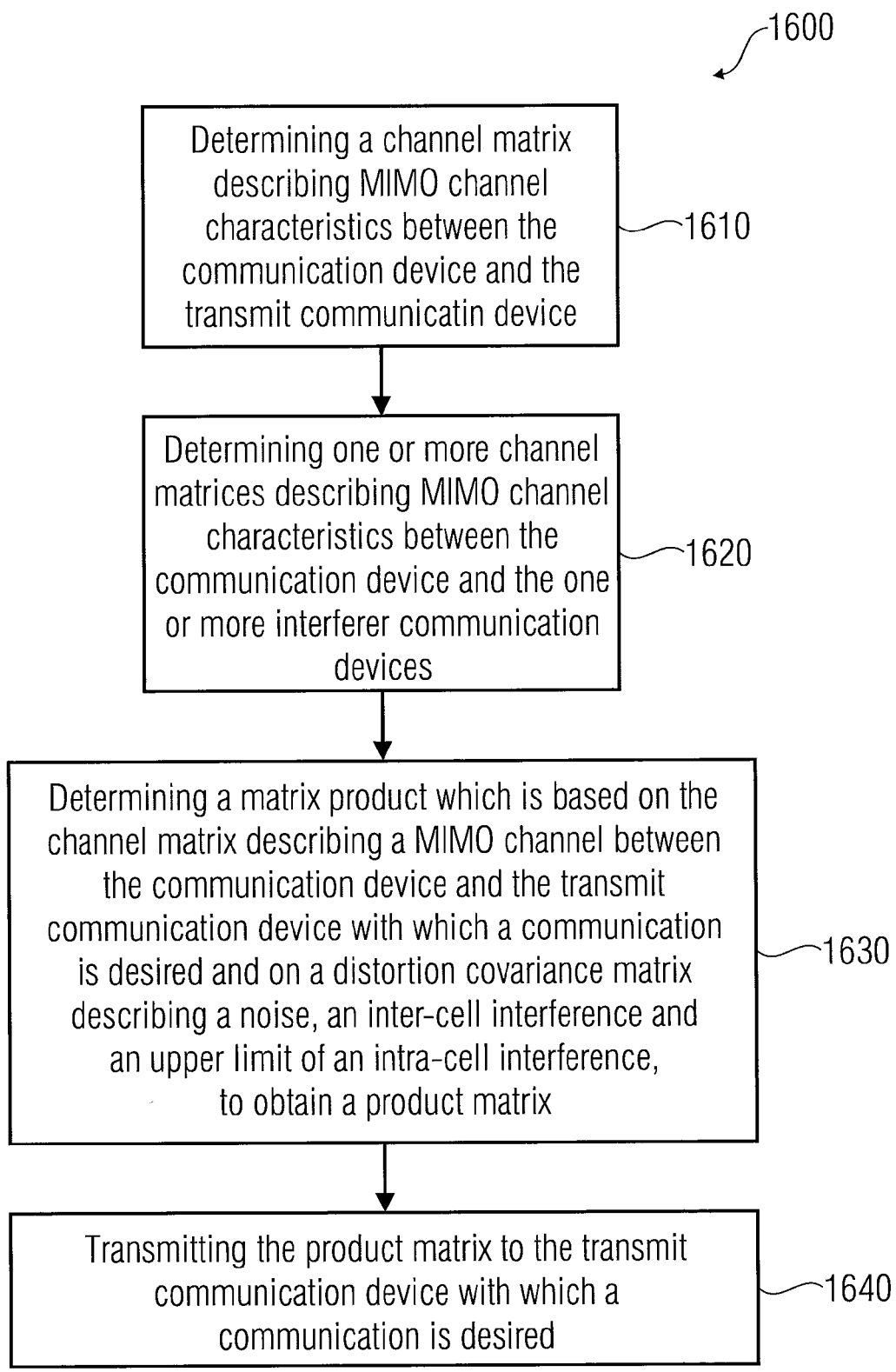
FIG. 16 shows a flowchart of a method for operating a communication device according to an embodiment of the invention.

FIG. 16 shows a flowchart of a method 1600 for operating a communication device for communicating with a transmit communication device in the presence of one or more interferer communication devices. It should be noted that the term "transmit communication device" designates a communication device with which a communication is desired, like, for example, a base station in a current cell in which the communication device performing the method 1600 is arranged. The interferer communication devices may, for example, be base stations of adjacent communication cells, adjacent to the communication cell in which the communication device performing the method 1600 is arranged.

The method 1600 comprises a step 1610 of determining a channel matrix describing MIMO channel characteristics between the communication device and the transmit communication device (with which the communication is desired and which is typically in the same communication cell as the communication device performing the method 1600). The method 1600 also comprises a step 1620 of determining one or more channel matrices describing MIMO channel characteristics between the communication device and the one or more interferer communication devices (for example, base stations arranged in different communication cells, which different communication cells are adjacent to the communication cell in which the communication device performing the method 1600 is arranged). Steps 1610 and 1620 may be performed simultaneously in some embodiments, and subsequently in other embodiments.

The method 1600 also comprises a step 1630 of determining a matrix product which is based on the channel matrix describing a MIMO channel between the communication device and the transmit communication device with which a communication is desired and on a distortion covariance matrix describing a noise, an inter-cell interference and an upper limit of an intra-cell interference to obtain a product matrix. For details, reference is made, for example, to the functionality of the matrix product determinator 1530, which may perform the determination 1630.

Moreover, the method 1600 comprises a step 1640 of transmitting the product matrix (or an information describing the product matrix itself, rather than the channel matrix or the distortion covariance matrix individually) to the transmit communication device with which a communication is desired (i.e. the communication device performing the method 1600).

It should be noted that the method 1600 implements the functionality of the communication device 1500.

10. Conclusions

To conclude, it should be noted that embodiments according to the invention introduce a so-called "unitary-LISA" algorithm, a low-complexity solution for linear unitary precoding in a multi-user MIMO downlink. Unitary precoding results in a white sum-transmit covariance, which allows for a better approximation of interference in the neighboring cells and enables to compute optimal receive filters and perfect link rate adaptation. Moreover, an embodiment according to the invention creates a method for the associated channel feedback. In other words, a method for the associated channel feedback is included in the invention.

Moreover, it should be noted that embodiments of the invention are based on the finding that, for unitary precoding, interference depends on the own precoder. Accordingly, a new method named "Adaptive Unitary Precoding—Unitary LISA" is created. Embodiments according to the invention create an extension to multi-antenna receivers. In the embodiments, interference plus noise covariance of a stream d are considered. For details, reference is made to the above-described formula or the calculation of said covariance $C_d$.

Moreover, embodiments according to the invention are based on a computation rule for the data rate of the stream d. For details, reference is made to the above equations which describe the computation of the data rate $r_d$.

In some embodiments of the invention, the fact that $$H_{s_d}^H C_{n,s_d}^{-1} H_{s_d}$$

can be computed at the receiver is exploited. In other words, it is advantageous in some embodiments to have a new type of feedback from the receive communication device to the transmit communication device. However, the new feedback, which brings along efficiency improvement, is different from conventional feedback (provided conventionally from a receive communication device to a transmit communication device), but is not increased. In other words, the feedback in the form of a product matrix typically does not necessitate a larger bitrate than conventional feedback.

Some embodiments according to the invention are based on the main idea to use a projection matrix to obtain unitary precoders. For details, reference is made, for example, to the detailed discussion of the algorithm, which was made with respect to FIG. 14.

Some embodiments according to the invention create a unitary precoding for users with multiple receive antennas. Some main features of the embodiments of the invention are as follows:

Embodiments according to the invention are robust: optimal receive filters and link-rate adaptation can be found without additional overhead.

Embodiments according to the invention allow multiple data streams per user;

Embodiments according to the invention bring along a low complexity (which may be lower than the complexity of the alternative algorithm "LISA")

Embodiments according to the invention may avoid an increase in feedback.

Thus, embodiments according to the invention differ significantly from alternative solutions.

In the following, a multi-cell/cooperative multipoint (CoMP) simulation setup will be described. The setup is as follows:

57 cells wrap-around;
Average 10 mobile users per cell randomly distributed
4×4 MIMO;
Rayleigh fading (vehicular users);
Fractional reuse/proportional fair.
The following Algorithms are compared:
PU2RC (LTE-codebook)
LISA (second pilot);

Local optimal (heuristic user selection);
Gram-Schmidt (extended to multi-user); and
Unitary LISA (according to the present invention).

Figure 19:
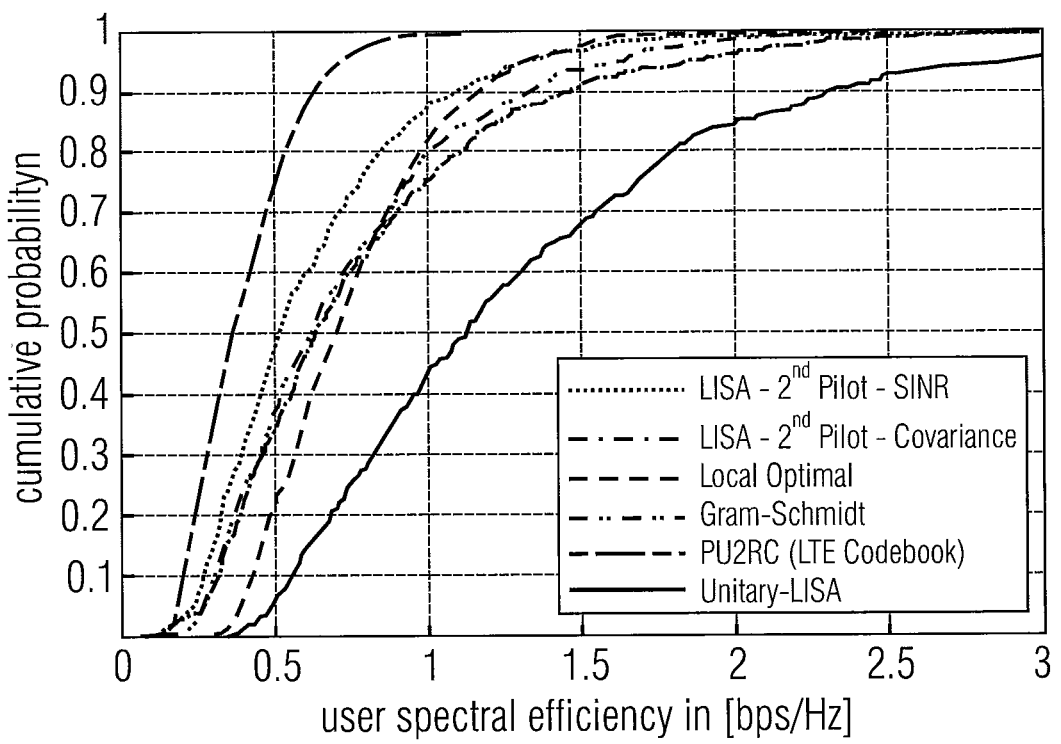
FIG. 19 shows a graphic representation of a comparison of the "unitary-LISA" algorithm versus alternative algorithms.

For results, reference is made to FIG. 19, which shows a graphical representation of the simulation results. FIG. 19 shows CDF average user rates.

To further conclude, a simple embodiment according to the invention creates a linear successive user allocation method jointly precoding and selecting users, comprising unitary precoders at the transmitters.

An improvement of said linear successive user allocation further comprises optimal receive filters and optimal link-rate adaptation.

A further improvement of the above-described methods further comprises a channel feedback scheme where the noise covariance matrix is incorporated without increasing the feedback amount.

To further summarize the above, embodiments according to the invention can be applied in multi-cell MIMO communications.

Embodiments of the invention are based on an investigation of different paradigms of cooperation in multi-cell communication networks, on an identification of the potential of those cooperation strategies in cellular communication networks based on MIMO systems, and on a development of respective concepts and algorithms in order to achieve significant gains compared over conventional techniques.

To further conclude, embodiments according to the invention can be used in wireless access, and, in particular, in radio access networks.

To further conclude and briefly summarize, embodiments according to the invention create an adaptive unitary precoding, unitary-LISA. Embodiments according to the invention comprise an extension of unitary precoding to multiple receive antennas. Embodiments according to the invention do not need additional feedback. Embodiments according to the invention provide an optimal rate adaptation and/or provide for optimal receive filters (wherein the latter may, in some cases, cause some overhead).

Embodiments according to the invention outperform alternative solutions for linear unitary precoding like, for example:
1) PU2RC (see, for example, reference [B5]);
2) optimization-based concepts, wherein for a given user selection (see, for example, reference [B6], [B7], and [B8]), optimal user selection is infeasible; and
3) heuristics for joint precoder and user selection, like, for example, Gram-Schmidt to predetermine precoders (see, for example, reference [B9]), and successive precoder and user allocation (see, for example, reference [B10]).

It should be noted that the above solutions 2) and 3) are only applicable for single antenna receivers, while embodiments according to the invention are applicable in environments in which receivers comprise a multiple antenna.

To further conclude, embodiments according to the invention reach the goal to reduce uncertainty in interference to obtain more robust downlink strategies.

11. Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

BIBLIOGRAPHY

[1] A. Osseiran and A. Logothetis. Closed loop transmit diversity in WCDMA HS-DSCH. In *Proc. IEEE 61st Vehicular Technology Conference, VTC* 2005-Spring, volume 1, pages 349-353, 2005.

[2] M. T Ivrlac and J. A Nossek. Intercell-Interference in the Gaussian MISO broadcast channel. In *IEEE Global Telecommunications Conference, 2007. GLOBECOM '07*, pages 3195-3199, November 2007.

[3] A. Dotzler and W. Utschick. Multi-cell MIMO communications. Technical report, Technische Universität München, 2009. Final Technical Report of the Research Cooperation: Multicell MIMO Communications—Phase I, NTT DoCoMo Euro Labs and TUM.

[4] H. Weingarten, Y. Steinberg, and S. Shamai. The capacity region of the Gaussian Multiple-Input Multiple-Output broadcast channel. *IEEE Transactions on Information Theory*, 52(9):3936-3964, September 2006.

[5] N. Jindal, S. Vishwanath, and A. Goldsmith. On the duality of Gaussian multiple-access and broadcast channels. *IEEE Transactions on Information Theory*, 50(5):768-783, May 2004.

[6] J. Brehmer and W. Utschick. Optimal interference management in multi-antenna, multi-cell systems. *International Zurich Seminar on Communications (IZS)*, March 2010.

[7] M. Rossi, A. M Tulino, O. Simeone, and A. M Haimovich. Non-convex utility maximization in gaussian MISO broadcast and interference channels. In *2011 IEEE International Conference on Acoustics, Speech and Signal Processing (ICASSP)*, pages 2960-2963. IEEE, May 2011.

[8] R. Hunger, D. A Schmidt, and M. Joham. A combinatorial approach to maximizing the sum rate in the MIMO BC with linear precoding. In *2008 42nd Asilomar Conference on Signals, Systems and Computers*, pages 316-320. IEEE, October 2008.

[9] P. Tejera, W. Utschick, G. Bauch, and J. A Nossek. Sub-channel allocation in multiuser Multiple-Input-Multiple-Output systems. *IEEE Transactions on Information Theory*, 52(10):4721-4733, October 2006.

[10] P. Tejera, W. Utschick, and J. A. Nossek. Patent: Subchannel allocation in multiple input multiple output multiuser communication systems, July 2004.

[11] C. Guthy, W. Utschick, and G. Dietl. Low-Complexity linear Zero-Forcing for the MIMO broadcast channel. *IEEE Journal of Selected Topics in Signal Processing*, 3(6):1106-1117, December 2009.

[12] C. Guthy, W. Utschick, G. Dietl, and P. Tejera. Efficient linear successive allocation for the MIMO broadcast channel. In *2008 42 nd Asilomar Conference on Signals, Systems and Computers*, pages 336-340, October 2008.

[13] P. Tejera, C. Guthy, W. Utschick, G. Dietl, and J. A. Nossek. A spatial Sub-Channel selection and Pre-Coding apparatus european patent application 08009276.0. (pending), 2008.

[14] A. Dotzler, M. Riemensberger, and W. Utschick. Uplink-downlink minimax duality with linear conic constraints. Technical report, 2012. submitted to ISIT.

[15] Hojin Kim, Chang Soon Park, and Kwang Bok Lee. On the performance of multiuser MIMO systems in WCDMA/HSDPA: Beamforming, feedback and user diversity. *IEICE Transactions on Communications*, E89-B(8):2161-2169, 2006.

[16] A. Jalali and D. J. Love. Closed-form expression for optimal two-user MIMO unitary precoding. *IEEE Communications Letters*, 13(4):251-253, April 2009.

[17] R. de Francisco and D. T. M Slock. An optimized unitary beamforming technique for MIMO broadcast channels. *IEEE Transactions on Wireless Communications*, 9(3): 990-1000, March 2010.

[18] S. Wagner, S. Sesia, and D. Slock. On unitary beamforming for MIMO broadcast channels. In *2010 IEEE International Conference on Communications (ICC)*, pages 1-5. IEEE, May 2010.

[19] R. de Francisco, M. Kountouris, D. T. M Slock, and D. Gesbert. Orthogonal linear beamforming in MIMO broadcast channels. In *IEEE Wireless Communications and Networking Conference, 2007. WCNC 2007*, pages 1210-1215. IEEE, March 2007.

[20] J. Duplicy, D. P Palomar, and L. Vandendorpe. Adaptive orthogonal beamforming for the mimo broadcast channel. In *2nd IEEE International Workshop on Computational Advances in Multi-Sensor Adaptive Processing, 2007. CAMPSAP 2007*, pages 77-80. IEEE, December 2007.

[21] Fang Liang, Gong Ping, and Wu Weiling. A user scheduling scheme for MU-MIMO system with coordinated beamforming. In *2010 2nd International Conference on Advanced Computer Control (ICACC)*, volume 4, pages 462-465. IEEE, March 2010.

[22] A. J Tenenbaum and R. S Adve. Linear processing and sum throughput in the multiuser MIMO downlink. *IEEE Transactions on Wireless Communications*, 8(5):2652-2661, May 2009.

[23] A. Dotzler and W. Utschick. Multi-cell mimo communications—phase ii. Technical report, Technische Universität München, 2011. *2nd Technical Report of the Research Cooperation: Multicell MIMO Communications-Phase III, NTT DoCoMo Euro Labs and TUM*.

[B1] M. T Ivrlac and J. A Nossek. Intercell-Interference in the Gaussian MISO broadcast channel. In IEEE Global Telecommunications Conference, 2007. GLOBECOM '07, pages 3195-3199, November 2007.

[B2] A. Dotzler and W. Utschick. Multi-cell MIMO communications. Technical report, Technische Universität München, 2009. Final Technical Report of the Research Cooperation: Multicell MIMO Communications—Phase I, NTT DoCoMo Euro Labs and TUM.

[B3] P. Tejera, W. Utschick, G. Bauch, and J. A Nossek. Subchannel allocation in multiuser Multiple-Input-Multiple-Output systems. IEEE Transactions on Information Theory, 52(10):4721-4733, October 2006.

[B4] C. Guthy, W. Utschick, and G. Dietl. Low-Complexity linear Zero-Forcing for the MIMO broadcast channel. IEEE Journal of Selected Topics in Signal Processing, 3(6):1106-1117, December 2009.

[B5] Hojin Kim, Chang Soon Park, and Kwang Bok Lee. On the performance of multiuser MIMO systems in WCDMA/

HSDPA: Beamforming, feedback and user diversity. IEICE Transactions on Communications, E89-B(8):2161-2169, 2006.
[B6] A. Jalali and D. J. Love. Closed-form expression for optimal two-user MIMO unitary precoding. IEEE Communications Letters, 13(4):251-253, April 2009.
[B7] R. de Francisco and D. T. M Slock. An optimized unitary beamforming technique for MIMO broadcast channels. IEEE Transactions on Wireless Communications, 9(3): 990-1000, March 2010.
[B8] S. Wagner, S. Sesia, and D. Slock. On unitary beamforming for MIMO broadcast channels. In 2010 IEEE International Conference on Communications (ICC), pages 1-5. IEEE, May 2010.
[B9] R. de Francisco, M. Kountouris, D. T. M Slock, and D. Gesbert. Orthogonal linear beamforming in MIMO broadcast channels. In IEEE Wireless Communications and Networking Conference, 2007. WCNC 2007, pages 1210-1215. IEEE, March 2007.
[B10] J. Duplicy, D. P Palomar, and L. Vandendorpe. Adaptive orthogonal beamforming for the MIMO broadcast channel. In 2nd IEEE International Workshop on Computational Advances in Multi-Sensor Adaptive Processing, 2007. CAMPSAP 2007, pages 77-80. IEEE, December 2007.

What is claimed is:

1. A communication device for communicating with a transmit communication device in the presence of one or more interferer communication devices,
    wherein the communication device is configured to determine a channel matrix describing MIMO channel characteristics between the communication device and the transmit communication device, and to also determine one or more channel matrices describing MIMO channel characteristics between the communication device and the one or more interferer communication devices, and
    wherein the communication device is configured to determine a matrix product which is based on the channel matrix describing a MIMO channel between the communication device and the transmit communication device and on a distortion covariance matrix describing a noise, an inter-cell interference and an upper limit of an intra-cell interference, to acquire a product matrix,
    wherein the communication device is configured to transmit the product matrix to the transmit communication device, and
    wherein the communication device is implemented using a hardware apparatus, or using a computer, or using a combination of a hardware apparatus and a computer.

2. The communication device according to claim 1, wherein the communication device is configured to acquire the distortion covariance matrix on the basis of a noise information describing a noise effective for the communication device, on the basis of the channel matrix describing the MIMO channel characteristics between the communication device and the transmit communication device, and on the basis of the one or more channel matrices describing the MIMO channel characteristics between the communication device and the one or more interferer communication devices.

3. The communication device according to claim 1, wherein the communication device is configured to determine the product matrix M according to $$M = H_{s_d}^H C_{\eta, s_d}^{-1} H_{s_d}$$

wherein $H_{s_d}$ is the channel matrix describing the MIMO channel characteristics between the communication device and the transmit communication device, and
wherein the distortion covariance matrix $C_{\eta, s_d}$ is defined as $$C_{\eta, s_d} = \sigma^2 I + \frac{P}{N_{tx}} \sum_{t \in I} H_{s_d t} H_{s_d t}^H + \frac{P}{N_{tx}} H_{s_d} H_{s_d}^H,$$

wherein σ designates a noise information;
wherein I designates an identity matrix;
wherein P designates a transmit power;
wherein $N_{tx}$ designates a number of antennas of the transmit communication device;
wherein t is a running variable designating interferer communication devices;
wherein I designates a set of one or more interferer communication devices;
wherein $H_{s_d t}$ designates the one or more channel matrices describing MIMO channel characteristics between the communication device and the one or more interferer communication devices; and
wherein $H_{s_d}$ designates the channel matrix describing MIMO channel characteristics between the communication device and the transmit communication device.

4. A method for operating a communication device for communicating with a transmit communication device in the presence of one or more interferer communication devices,
    wherein the method comprises determining a channel matrix describing MIMO channel characteristics between the communication device and the transmit communication device,
    determining one or more channel matrices describing MIMO channel characteristics between the communication device and the one or more interferer communication devices, and
    wherein the method comprises determining a matrix product which is based on the channel matrix describing a MIMO channel between the communication device and the transmit communication device and on a distortion covariance matrix describing a noise, an inter-cell interference and an upper limit of an intra-cell interference, to acquire a product matrix, and
    wherein the method comprises transmitting the product matrix to the transmit communication device.

5. A non-transitory digital storage medium configured to store data defining a computer program for performing the method according to claim 4 when the computer program runs on a computer.

* * * * *